(12) United States Patent
Horsthemke et al.

(10) Patent No.: US 12,416,489 B2
(45) Date of Patent: Sep. 16, 2025

(54) METHOD FOR MEASURING A THICKNESS OF A FILM OR PLATE, SYSTEM FOR MANUFACTURING A FILM OR PLATE OF THIS TYPE, AND METHOD FOR OPERATING A SYSTEM OF THIS TYPE

(71) Applicant: Albrecht Baumer GmbH & Co. KG Spezialmaschinenfabrik, Freudenberg (DE)

(72) Inventors: Jan Horsthemke, Siegen (DE); Christoph Moisel, Cologne (DE); Inal Rocky D'Costa, Hagenerstr (DE)

(73) Assignee: Albrecht Bäumer GmbH & Co.KG Spezialmaschinenfabrik, Freudenberg (DE)

( * ) Notice: Subject to any disclaimer, the term of this patent is extended or adjusted under 35 U.S.C. 154(b) by 0 days.

(21) Appl. No.: 18/686,418

(22) PCT Filed: Aug. 22, 2022

(86) PCT No.: PCT/EP2022/073311
§ 371 (c)(1),
(2) Date: Feb. 25, 2024

(87) PCT Pub. No.: WO2023/025717
PCT Pub. Date: Mar. 2, 2023

(65) Prior Publication Data
US 2024/0328778 A1 Oct. 3, 2024

(30) Foreign Application Priority Data
Aug. 26, 2021 (DE) .......................... 102021122099.8

(51) Int. Cl.
*G01N 11/06* (2006.01)
*B26D 3/00* (2006.01)
(Continued)

(52) U.S. Cl.
CPC .......... *G01B 11/0616* (2013.01); *B26D 3/006* (2013.01); *B26D 5/007* (2013.01); *B26D 7/27* (2013.01); *G01B 11/06* (2013.01)

(58) Field of Classification Search
CPC . G01B 11/0616; G01B 11/06; G01B 11/0691; G01B 21/08; B26D 3/006;
(Continued)

(56) References Cited

U.S. PATENT DOCUMENTS 3,244,206 A 4/1966 Bossen
4,030,386 A * 6/1977 Poetzsch ................ B26D 3/006
83/811
(Continued)

FOREIGN PATENT DOCUMENTS

DE 6751802 U * 2/1969
DE 102004051235 A 5/2006
(Continued)

OTHER PUBLICATIONS

Poizat, Christophe, "International Search Report & Written Opinion", International Application No. PCT/EP2022/073311, mailed Nov. 18, 2022, 32 pages.
(Continued)

*Primary Examiner* — Michelle M Iacoletti
*Assistant Examiner* — Judy Dao Tran
(74) *Attorney, Agent, or Firm* — Foley IP Law, PLLC

(57) ABSTRACT

The invention relates to a method for measuring a thickness (d) of a film (90') or sheet (90), wherein the film (90') or sheet (90) is cut as an article of manufacture made from a block material intended as a source material (80), in particular, from a block of foam. The source material has a source-material length (81, 85) extending in the longitudinal direction (x; x'), a source-material width extending in the latitudinal direction (y) (82, 86) and a source-material height extending in the vertical direction (z) (83, 87). In this method, the source material is conveyed along the longitudinal direction (x; x') to a cutting unit (50) in order to cut the source material. The cutting unit (50) cuts the film (90') or sheet (90) out of the source material along the longitudinal direction (x; x'). In addition, in order to determine the thickness (d) of the film (90') or sheet (90), the thickness (d) along the vertical direction (z) is determined. Furthermore,
(Continued)

Figure 1:
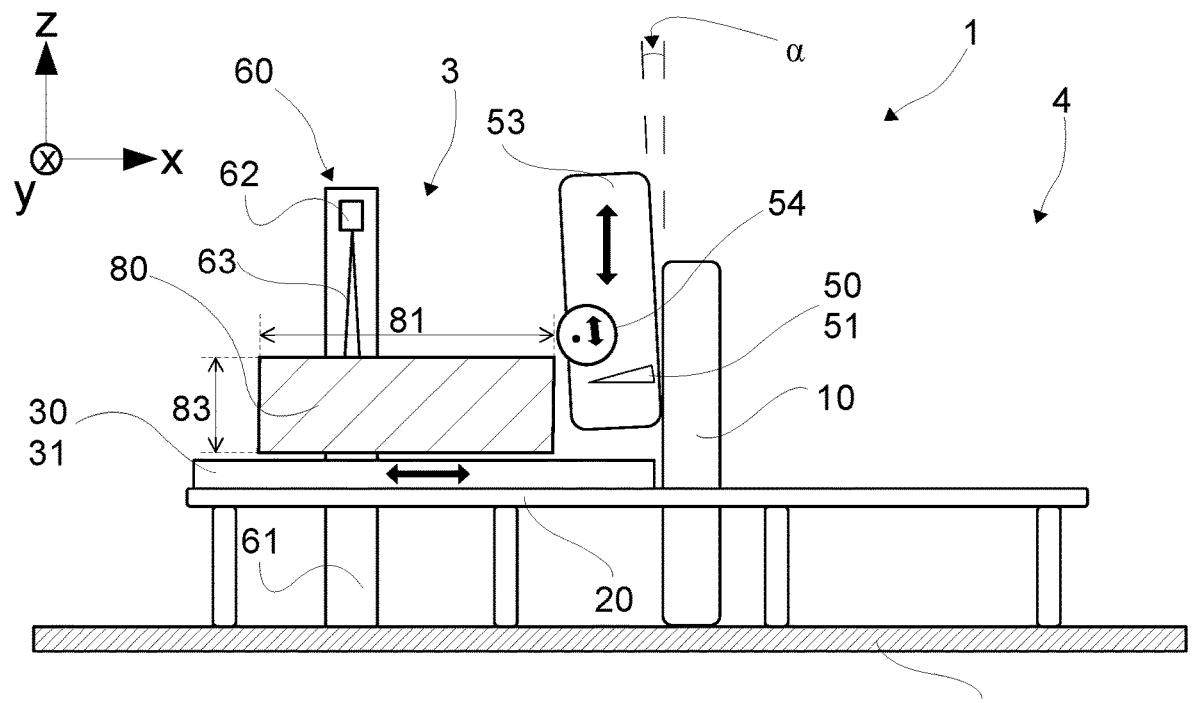

the invention relates to a system for manufacturing a film (90') or sheet (90), as well as a method for operating such a system.

22 Claims, 5 Drawing Sheets

(51) Int. Cl.
*B26D 5/00* (2006.01)
*B26D 7/27* (2006.01)
*G01B 11/06* (2006.01)

(58) Field of Classification Search
CPC . B26D 5/007; B26D 7/27; B26D 1/02; B26D 5/00; B26D 7/0608; B26D 7/2628; B26D 3/28
See application file for complete search history.

(56) References Cited

U.S. PATENT DOCUMENTS

| | | | |
|---|---|---|---|
| 6,034,772 A * | 3/2000 | Marcus | G06F 15/00 356/503 |
| 6,269,724 B1 | 8/2001 | Sabatelli | |
| 2004/0065973 A1 * | 4/2004 | Ehbing | B29C 44/60 425/4 C |
| 2006/0162816 A1 | 7/2006 | Hyysti | |
| 2006/0167121 A1 * | 7/2006 | Ehbing | B29C 44/60 521/50 |
| 2012/0043026 A1 | 2/2012 | Tillmann et al. | |
| 2018/0009124 A1 * | 1/2018 | Munteanu | B26D 1/54 |

FOREIGN PATENT DOCUMENTS

| | | | | |
|---|---|---|---|---|
| DE | 102004051235 A1 * | 5/2006 | | B65H 18/16 |
| DE | 102018111307 A1 * | 11/2019 | | B27L 5/00 |
| FR | 1193245 A | 10/1959 | | |
| JP | H0976208 A * | 11/1999 | | B27L 5/06 |
| JP | 2007218617 A | 8/2007 | | |

OTHER PUBLICATIONS

Poizat, Christophe, "International Preliminary Report on Patentability", International Application No. PCT/EP2022/073311, mailed Jun. 27, 2023, 15 pages.

Fromentin et al., "Development of a precision machine to perform and study orthogonal micro-cutting", HAL Open Science, copyright 2016, 11 pages.

* cited by examiner

METHOD FOR MEASURING A THICKNESS OF A FILM OR PLATE, SYSTEM FOR MANUFACTURING A FILM OR PLATE OF THIS TYPE, AND METHOD FOR OPERATING A SYSTEM OF THIS TYPE

The present invention relates to a method for determining the thickness of a film or a sheet. Furthermore, the invention relates to a system for manufacturing a film or a sheet as an article of manufacture made of a block material intended as a source material comprising the features of the preamble of claim 3. Furthermore, the invention relates to a method for operating a system for manufacturing a film or a sheet as an article of manufacture made of a block material intended as a source material.

Systems as well as corresponding methods for the operation of such systems, which are used for manufacturing films or also sheets made of a non-metallic, usually soft block material, are generally known from prior art. However, the present invention makes an improvement possible with regard to the automation of the known systems or methods, as well as the quality assurance of the corresponding articles of manufacture in the form of films or sheets.

Thus, in principle, systems are known in which a film or a sheet is obtained as an article of manufacture made of a block material intended as a source material, wherein the present invention relates, in particular, to manufacturing performed on a non-metallic source material, mostly plastic-based, such as a foam block as a source material for example. The source material is often porous. The source material can also be a composite material, such as a sandwich material. The processed source material regularly has a tensile strength of up to approximately 30 MPa and a density of up to 1400 kg/m$^3$.

The source material processed on such systems in the form of the block material has a source-material length extending in the longitudinal direction, a source-material width extending in the latitudinal direction and a source-material height extending in the vertical direction. In such systems, a conveyor unit is provided which can convey the source material essentially along the longitudinal direction. It can also happen or even be desirable that the conveying direction is not exactly parallel to the longitudinal direction of the block material, which is regularly provided in cuboid form, but that the block material comprises a minimal inclination with respect to the conveying direction.

In addition, such systems comprise a cutting unit which is used to cut out the article of manufacture, i.e., the film or the sheet, from the source material, essentially along the longitudinal direction. The cutting unit comprises a cutting tool that essentially runs along the latitudinal direction.

In the context of this application, the three directions referred to (longitudinal direction, latitudinal direction, vertical direction) are to be understood in the following as serving as an orientation with regard to the systems. Using the example of the processing of a rectangular block material moving back and forth in a reversing manner on a system, the longitudinal direction corresponds to the conveying direction, while the latitudinal direction extends perpendicular to it in a horizontal plane and along the tool of the cutting unit. The vertical direction is then the third perpendicular direction in the sense of a Cartesian coordinate system, wherein the vertical direction extends vertically upwards. This also applies if the rectangular block material comprises the slight inclination mentioned above, and therefore, the length of the rectangular block material does not run exactly along the longitudinal direction and the width in turn does not run exactly in the latitudinal direction. Since this is only a minimal inclination, which is usually deliberately implemented and known, the operator of the system is also aware that the source-material length extending in the longitudinal direction is not exactly equal to the length of the rectangular block material, and that the source-material width extending in the latitudinal direction does not correspond exactly to the width of the rectangular block material. The longitudinal direction can therefore basically be understood as the conveying direction, while the latitudinal direction is perpendicular to it.

This also applies to other deviating embodiments on systems, such as a rotary table, which does not convey the block material back and forth, but circumferentially in a circle. Here, cuboid block materials are also regularly used as a source material. In this system, the longitudinal direction also corresponds to the conveying direction, wherein the longitudinal direction therefore extends along the circumference of the rotary table. The latitudinal direction corresponds to the radial direction of the rotary table, while the vertical direction again extends vertically upwards perpendicular to the two directions. The tool of the cutting unit also extends along the latitudinal direction of a rotary table. Again, the rectangular block material, for example, can also be placed on the table with a slight inclination so that the width of the rectangular block material does not extend exactly in the latitudinal direction.

In the case of a third example of a system, i.e., if the source material is conveyed as a round block on a central roller, the longitudinal direction basically corresponds to the conveying direction of the system in relation to the block material. For example, the block material, which is a round block in the sense of a geometrical body of a hollow cylinder, is conveyed circumferentially around the central roller. The longitudinal direction or conveying direction therefore runs along the circumference of the central roller or along the circumference of the round block. Accordingly, the source-material length corresponds to the circumference of the block material available as a round block. The latitudinal direction is again perpendicular to this, along the shell surface of the round block, i.e., along the height of the hollow cylinder. The vertical direction is again perpendicular to the two directions mentioned, that being along the radial direction in relation to the central roller or the round block.

For the intended cutting, for example, of the foam block or the other material blocks mentioned, the source material provided as block material is passed by the cutting unit, wherein an upper layer of the foam block, as viewed in the vertical direction, is cut off or split off as a film or a sheet. For this purpose, the cutting unit comprises, for example, a blade bar with a circumferential blade. This can be guided or held and supported between a double wedge or also between a single wedge above and below supported by a brace. In such wedges, which can also be commonly referred to as cutting wedges, the wedge tip is orientated in the direction of the block material conveyed to the cutting unit, i.e., against the conveying direction or the longitudinal direction. In turn, the circumferential blade moves in a direction perpendicular to the tip of the wedge, specifically in the latitudinal direction, in order to make the cut itself. Alternatively, the cutting unit can also comprise only one circumferential blade, which is held and supported along its entire length between braces without a cutting wedge. It is also possible to cut by means of a circumferential saw, which saw is also guided circumferentially but is not supported over the entire length, or wire cutting can be carried out. Instead of tools (blade, saw, wire) that carry out the cutting in the latitudinal direction or perpendicular to the conveying direction, the tool can also be moved oscillating in movements back and forth along the latitudinal direction or perpendicular to the conveying direction, particularly when cutting wire, in order to make the intended cut.

In any case, the upper layer separated by the cutting unit represents the article of manufacture in the form of the film (e.g., foam film) or the sheet. In the case of a film, the article of manufacture is regularly removed from the system and wound up into a coil of foam film, for example. Sheets, in turn, are also removed from the system and the cut remaining block material can then be used again as a source material for cutting out another sheet or further layers of film.

The conveyor units of such systems are therefore set up in such a way that, in order to cut the source material, the source material is conveyed along the longitudinal direction past the cutting unit.

Continuous quality control of the process is necessary for manufacturing films or sheets from a source material used as a block material, thereby having a specified and, above all, uniform quality. For example, a thickness of the film or the sheet to be manufactured is specified in the vertical direction. In order to cut a plurality of layers of film or a plurality of sheets of the same constant thickness made of a block material one after the other, it is necessary to adjust the vertical orientation of the cutting unit to the source material, as a source material decreases in its source-material height continuously with each cut layer of film or sheet. The measurement of the thickness of the film or the sheet that has already been cut can be used to correct any errors in the alignment of the cutting unit with the source material during the course of using a block material. If, for example, the cut sheet or film turns out to be too thick or too thin, this could be due to the orientation or position of the cutting unit in relation to the block material, for example.

Accordingly, it is favourable if the thickness of the film or the sheet is determined along the vertical direction. For this purpose, the system can comprise a measurement device for measuring on a surface of a measurement object. In this respect, it is known from prior art to use measuring methods aimed directly at the cut film or the sheet, i.e., to align a measurement device directly with the cut film or sheet and thus measure the thickness directly.

However, the direct measurement of a film or a sheet as an article of manufacture is associated with various disadvantages. For example, the measurement method must be carried out in the discharge area of a system or in a subsequent area if the film or the sheet has already been removed from the system. This adversely increases the space requirement of the entire system. Furthermore, the cut films or sheets are relatively thin measurement objects. In order to carry out an accurate measurement of the thickness, it is necessary that the film or the sheet is well positioned as the measurement object and that the position is stable while the measurement is taking place. Furthermore, there is the problem, particularly in the case of films removed from the system, that a change in thickness or thickness falsification takes place as a result of the pulling off, i.e., the removal, of the film itself. For example, a tensile force exerted on the film can lead to thinning of the material. If the thickness of the corresponding film is measured in such a range or moment, this also leads to falsified results. In addition, there is the disadvantage that if different films or sheets of different thicknesses have to be manufactured on a system, the corresponding measurement devices, which are optimized for the thicknesses of the films or sheets, have to be adapted or recalibrated at great expense. This makes the systems less flexible and the manufacturing process slow overall, as a plurality of adjustments can be necessary depending on the film or the sheet to be manufactured, particularly with regard to a different desired thickness.

An object of the present invention is to remedy this situation and to avoid the disadvantages described. Specifically, an object of the invention entails further developing the known method for determining a thickness of a film or a sheet in such a way that it is more flexible and independent both of the source material as well as with regard to the desired film thickness or sheet thickness. Another task is to make the well-known system for manufacturing a film or a sheet more flexible with a view to manufacturing from different source materials and different film thicknesses or sheet thicknesses. In addition, the system is to be improved with regard to manufacturing uniformly good quality film or sheets, in particular, manufacturing constant film thicknesses or sheet thicknesses was to be further improved. Furthermore, an object of the invention is to provide a method for operating a system for manufacturing a film or a sheet which facilitates and accelerates manufacturing films or sheets with uniform film thickness or sheet thickness.

The task is solved with regard to the method for determining a thickness of a film or a sheet by means of a method comprising the features of the characterizing part of claim 1. With respect to the system, the task is solved by means of a system for manufacturing a film or a sheet as an article of manufacture made of a block material intended as a source material comprising the features of the characterizing part of claim 3. With regard to the method of operating a system, the task is solved by means of a method of operating a system for manufacturing a film or a sheet as an article of manufacture made of a block material intended as a source material comprising the features of claim 17. Favourable embodiments are the object of the dependent claims.

It is essential to the invention to realize that the described disadvantages from prior art can be avoided by means of the thickness of the cut film or the sheet no longer being measured directly via direct measurement but rather indirectly. The measurement object is the source material and no longer the article of manufacture itself, wherein the source material as a block material regularly comprises a multiple of the source-material height in the vertical direction with respect to the thickness of the film or the sheet to be determined. In addition, the source material rests safely and stably on a table in the system, for example in the area in front of the cutting unit. As a result, the framework conditions for the measurement object are known and a stable, and a reliable measurement can be carried out using the system's measurement devices. A subsequent falsification of the thickness of the film or the sheet, for example, when the article of manufacture is removed from the system, has no negative impact on the determination of the thickness of the film or the sheet, even if such falsification occurs. This is because by indirectly measuring the source-material heights or the measured values representing them, the cut thickness of the article of manufacture can be easily and yet accurately deduced by means of calculating the difference.

Specifically, the proposed method of measuring a thickness to solve the task entails a method of measuring the thickness of a film or a sheet, wherein the film or the sheet is cut as an article of manufacture from a block material intended as a source material, in particular, a block of foam, wherein the source material comprises a source-material length extending in the longitudinal direction, a source-material width extending in the latitudinal direction and a source-material height extending in the vertical direction. According to the proposal, as part of the method for cutting the source material, the source material is conveyed along the longitudinal direction to a cutting unit. In addition, the cutting unit cuts the film or the sheet out of the source material along the longitudinal direction. Ultimately, in order to determine the thickness of the film or the sheet, the thickness along the direction of the vertical direction is determined.

The proposed method for determining a thickness is characterized in that the thickness of the film or the sheet is determined, in a way that a measured value representing a preliminary source-material height before the source material is cut is measured and a measured value representing a subsequent source-material height after the source material is cut is measured, and that the thickness of the film or the sheet is calculated from the difference between the measured value representing a preliminary source-material height minus the measured value representing the subsequent source-material height.

Specifically, the proposed system for manufacturing a film or a sheet to solve the problem is a system for manufacturing a film or a sheet as an article of manufacture made of a block material intended as a source material, in particular, from a foam block, wherein the source material comprises a source-material length extending in the longitudinal direction, a source-material width extending in the latitudinal direction and a source-material height extending in the vertical direction. The system comprises a conveyor unit for conveying the source material along the longitudinal direction, as well as a cutting unit for cutting out the film or the sheet from the source material along the longitudinal direction, as well as a measurement device for measuring on a surface of a measurement object. The conveyor unit is set up in such a way that, in order to cut the source material, the source material is conveyed along the longitudinal direction past the cutting unit.

The proposed system for manufacturing a film or a sheet is characterized in that the measurement device is set up and arranged to measure the source-material height in such a way that the measurement device can measure a preliminary source-material height before cutting the source material and a subsequent source-material height after cutting the source material.

In detail, the proposed method for operating a system to solve the task entails a method for operating a precedingly described system for manufacturing a film or a sheet as an article of manufacture made of a block material intended as a source material, in particular, from a foam block, or for the operation of a subsequent favourable embodiment of a corresponding system for manufacturing a film or a sheet. In the proposed method for operating the system, the film or the sheet is cut out of the block material intended as a source material, in particular, the foam block, by means of the cutting unit. In addition, for the quality control of the cut film or sheet, a previously described method for determining the thickness of a film or a sheet is carried out, or a method for determining the thickness of a film or a sheet in accordance with one of the following favourable embodiments.

Both individual technical features as well as the advantages resulting therefrom, which can be found in the aforementioned or below with reference to the proposed method for measuring a thickness of a film or a sheet, as well as with regard to the proposed system for manufacturing a film or a sheet, as well as with regard to the proposed method for operating a system for manufacturing a film or a sheet, are transferable in a technically sensible way-even overarching across categories-between the different requirements and preferred embodiments. In this respect, reference can regularly be made to the description of the advantages of the specific features in the context of another category of claims. Specifically, the proposed system is preferably set up to carry out the proposed method for determining the thickness of a film or a sheet.

For the aforementioned measurement of the source-material heights, at least one measurement device is provided in the proposed system. This can be a measurement device that comprises a single measurement sensor, for example laser-based measurement sensor, or also a plurality of measurement sensors. The measurement device is arranged and orientated in such a way that the source-material heights are measured. Preferably, the measurement device is arranged and set up for measurement on the surface of the source material, i.e., from above against the vertical direction on the block material, both before cutting as well as after cutting.

In principle, a measurement device implements the measurement at a measurement-device position. In this context, the term "measurement-device position" basically refers to the spatial arrangement of the measurement device, i.e., its arrangement in the proposed system. Specifically, the measurement-device position mainly refers to the coordinate of the measurement device in the longitudinal direction of the block material or in the conveying direction in the system. One and the same measurement-device position in relation to the longitudinal direction then means one and the same position of the measurement device with respect to the longitudinal direction or conveying direction. The measurement device can be fixed in place, i.e., it can occupy a fixed position within the framework of the system so that none of the coordinates of the measurement device is variable, or the measurement device can also be set up to be adjustable in terms of position or orientation.

In contrast to the measurement-device position, the point on the measurement object where the desired measurement takes place by means of the measurement device is generally referred to as the measurement-target point. The measurement-target point is characterized in that, in relation to the measurement object, measurements are generally taken at one point of the measurement object, approximately, as viewed in vertical direction at the top on the surface of the block material, i.e., at a single position with the three spatial coordinates x with regard to the longitudinal direction y with regard to the latitudinal direction and z with regard to the vertical direction. In the case of a plurality of successive measurements, one and the same measurement-target point on the measurement object, i.e., on the block material, usually refers only to one and the same x and y coordinate, i.e., basically the same point of the measurement object in relation to the latitudinal direction and the longitudinal direction. The z-coordinate, on the other hand, i.e., the position, as viewed in the vertical direction, can of course differ on the measurement object between a plurality of measurements even at the same measurement-target point since an upper layer of the block material is always cut off by the cutting process and the block material decreases from section to section in terms of its extension in the vertical direction.

From one measurement-device position, under certain circumstances, it can also be possible for one and the same measurement device to drive towards different measurement-target points and thus take measurements of them in relation to the latitudinal direction or in relation to the longitudinal direction. An example of this are line sensors, which can also measure a plurality of measurement-target points at the same time from a single measurement-device position. Furthermore, a plurality of measurement-target points can also be driven towards by a single measurement device at a single measurement-device position since the measurement object in the form of the block material moves relative to the measurement device and thus relative to the measurement-device position. In addition, different measurement-target points of the block material can also be measured at different points in time at one and the same measurement-device position.

In this respect, the proposed method for measuring the thickness of a film or a sheet is characterized in that no single measurement-target point on the article of manufacture itself is provided, the thickness of which is to be determined. Measurements are only taken specifically on the block material itself, not on the film or the sheet that has already been cut.

In the present case, it is preferable if the two measurements of the source-material heights take place once before and once after cutting at the same measurement-target point in relation to the block material with respect to its coordinates. This is not the same point on the surface of the block material (i.e., not the same z-coordinate in the vertical direction), because the first measurement before cutting takes place at a first point, while then the cut film or sheet is discharged and only then does the second measurement after cutting take place at the same measurement-target point. Accordingly, the same measurement-target point basically refers to the same coordinates in relation to the block material to be cut or already cut (regularly the same x and y coordinates in the longitudinal direction and latitudinal direction).

Preferably, the source-material height can also take place both before cutting as well as after cutting at a plurality of measurement-target points in relation to the source material. For example, it can be provided that a source-material height is measured and then averaged over a plurality of measurement-target points extending along the longitudinal direction. Preferably, a plurality of measurement-target points can also be provided along the latitudinal direction. It is possible to control the plurality of measurement-target points with one and the same measurement sensor. For example, a line sensor can be used for this purpose. However, it is also possible to provide a plurality of measurement sensors, either distributed over the width along the latitudinal direction or over the length along the longitudinal direction. Another advantage of using a plurality of sensors or at least one line sensor with a larger measuring range is that if block materials of different widths or also lengths are used as a source material on one and the same system, successful measurement with good quality can still be guaranteed. It is also possible to determine the source-material width or the source-material length if desired.

An evaluation unit can be provided for processing the measured values in addition to a control unit for controlling the process and the system. The control unit can also be connected to the measurement device or the evaluation unit in order to use the measurements.

Within the framework of the proposed methods or by means of the proposed system, for example, also the heights, i.e., the preliminary source-material height before cutting the block material and the subsequent source-material height after cutting, cannot be used directly for measuring but rather measured values representing these heights. For example, optical measurements can be taken so that the measurement signal path is representative of the corresponding height. Furthermore, measurements can be taken on the surface of the block material and a distance of this surface to the substrate on which the block material rests, i.e., a distance between the surface of the measurement object and the contact surface of the measurement object, from which the height of the block material can then be determined. The measurement sensors used can also be originally calibrated to the contact surface, such as the moveable table. For example, even in the case of a height-adjustable measurement sensor, the values from the machine, which are sufficiently accurate for the desired measurement accuracy, which are effected by the vertical movement of the measurement sensor, can be included or taken into account and used.

Basically, in the present case, the term "measuring" is to be understood as an actual measurement process by means of a measurement sensor, while the term "determination" also includes the processing of the measured values, such as the proposed determination of the thickness of the produced film or sheet by means of a calculating the difference and thus a conversion of the two measured heights in the form of the source-material heights before and after cutting.

The use of an indirect measurement method, which no longer targets the article of manufacture but takes measurements on the source material to determine the thickness of the article of manufacture, as proposed, avoids various disadvantages. For example, in the case of appropriate systems as proposed, it is favourable to dispense with the need for complex additional devices, which are used, for example, to guide the material that is actually required for the measurement of a thin film or sheet. Such material guides for measuring the articles of manufacture, which usually have a much smaller thickness than the extension of the source-material height, are often necessary in prior art in order to achieve correct measurement results when measuring those films or sheets directly. For example, it is no longer necessary to determine a sheet for the proposed systems. For the purpose of reliable measurement, the stable guidance of the source material, which is to be provided anyway, can be used.

In addition, the proposed systems and the proposed method are much more flexible in terms of producing completely different films or sheets on one and the same system. Thus, the direct measurement methods of prior art, which are directly aimed at the article of manufacture to be measured, are also set up for the respective article of manufacture in the form of the film or the sheet, in particular, with regard to their expected thickness. The optical measurement devices, for example, are calibrated to the expected thickness or also have a specific sensitivity with regard to the measuring range depending on the distance to the measurement object, i.e., to the measurement-target point. The so-called linearity error of measurement sensors is relevant here. As a matter of principle, a measurement sensor only works optimally within a specific measuring range, specifically at a certain distance from the measurement object. When changing from a first film thickness to a second film thickness, a larger one for example, a time-consuming adjustment of the method and even the systems is regularly necessary. However, since, according to the proposal, the article of manufacture is no longer measured but rather the source material in the form of the block material, not so many adjustments have to be made when changing the film or the sheet thicknesses to be established. In particular, the systems can be set up in such a way that the distance between the measurement sensor and the measurement-target point is almost constant, regardless of the thickness of the product to be manufactured. As a result, the linearity error can be avoided.

Basically, the thickness of the film or sheet that is cut or split of from the block material can range from 0.3 mm to 700.0 mm as a material web. Preferably, the thickness of the cut film or sheet is between 1.0 mm and 30.0 mm. The preferred materials for the block material are foam, in particular, flexible foam made of polyurethane (PUR). Alternatively, it is also possible to use harder porous/foamed materials as block material and cut them into films or sheets. For example, polyethylene (PE) or various rubber-like, as well as composite, layered or structured, honeycomb-shaped, materials can also be used as block materials. Basically, non-metallic source materials, mostly plastic-based ones, are used. The source material can also be a composite material, such as a sandwich material. The processed source material regularly has a tensile strength of up to approximately 20 MPa and a density of up to 1400 kg/m³. Preferably, the feed rate of the block material can be between 1 m/min and 350 m/min, particularly preferably between 4 m/min and 100 m/min.

In accordance with a favourable embodiment, the method for measuring the thickness of a film or a sheet is characterized in that the preliminary source-material height and the subsequent source-material height are measured by a measurement device, preferably an optical one. The measurement device is preferably equipped with a laser-based measurement sensor. Furthermore, the measurement is favourable with regard to the longitudinal direction and latitudinal direction at the same measurement-target point. However, the measurement can also be carried out by means of two measurement sensors arranged at different measurement-device positions in relation to the longitudinal direction. These two measurement sensors nevertheless measure with regard to the longitudinal direction and latitudinal direction at the same measurement-target point, for example, if a first measurement sensor in front of the cutting unit measures on the block material before cutting and a second measurement sensor behind the cutting unit measures on the same measurement-target point of the block material but after discharging the cut film or sheet.

In accordance with a favourable embodiment, the system for manufacturing a film or a sheet is characterized in that a linear machine table is provided which comprises the conveyor unit and is set up for the support of the source material, and that the conveyor unit is set up on the support side of the linear machine table in front along the longitudinal direction and backwards in a reversing manner against the longitudinal direction. In this case, the block material to be cut can be placed on the conveyor unit itself and the block material can be cut as intended by the conveyor unit guiding the block material past the cutting unit, wherein the block material is cut open at its upper surface as viewed in the vertical direction. The contact surface for the block material can be formed by a perforated sheet and a negative pressure or vacuum can be set up underneath to suck the block material onto the contact surface.

In accordance with an alternative favourable embodiment, the system for manufacturing a film or a sheet is characterized in that a rotary table is provided that comprises the conveyor unit and is set up for the support of the source material, wherein the conveyor unit is designed as a circumferential contact surface of the rotary table and set up in a circumferential manner along the longitudinal direction. In this case, the longitudinal direction preferably corresponds to the direction running along the circumference of the rotary table. Preferably, the rotary table can also be moved back against the longitudinal direction. The contact surface of the rotary table can also be designed as a perforated sheet and a vacuum can be set up on the underside of the perforated sheet to suck in the block material.

In accordance with an alternative favourable embodiment, the system for manufacturing a film or a sheet is characterized in that a central roller is provided to receive the source material formed as a round block and that the conveyor unit is formed by the central roller in such a way that the central roller can be driven in the direction of rotation for conveying the source material. The central roller can preferably be designed as a driven roller itself. However, it is preferable that the central roller or the block material arranged on it are passively driven, for example, by providing separate drive rollers that drive the round block. The longitudinal direction is preferably along the circumferential direction of the central roller.

In accordance with another favourable embodiment, the system for manufacturing a film or a sheet is characterized in that the measurement device is arranged in relation to the longitudinal direction at a single measurement-device position and is used to measure the preliminary source-material height before cutting the source material and the subsequent source-material height after cutting the source material at this single measuring position, in particular, in a position determined by the latitudinal direction and vertical direction of the spanned measurement level. It is therefore favourable to implement a particularly compact system with just a few measurement devices. Thus, both the initial values, for example, of the source material as well as the thickness of the article of manufacture in the form of the film or the sheet can be implemented by means of the indirect measuring method described above by means of this measurement device arranged at a single measurement-device position. There is no need for separately provided measurement devices, such as in the case of technology from prior art for the self determination of the thickness of the article of manufacture.

In accordance with another favourable embodiment, the system for manufacturing a film or a sheet is characterized in that the measurement device is arranged in relation to the longitudinal direction at least at one first measurement-device position and at a second measurement-device position. Preferably, the measurement device is set up to measure the preliminary source-material height before cutting the source material at the first measurement-device position and set up to measure the subsequent source-material height after cutting the source material at the second measurement-device position. Furthermore, the measurement device is preferably designed with a first measurement sensor arranged at the first measurement-device position and with a second measurement sensor arranged at the second measurement-device position. As a result, the two measurements required to determine the thickness, namely the preliminary measurement of the block material before cutting and the subsequent measurement of the source-material height after cutting, can be favourably carried out at two different measurement-device positions, in particular, by two independent measurement sensors. In this way, the two measuring tasks can be favourably separated from each other. In addition, the speed of the measurement can be increased, as the second measurement-device position in relation to the system can be adjusted so that the block material is measured at a location that follows immediately or at least quickly after the discharge of the cut article of manufacture from the block material.

In accordance with another favourable embodiment, the system for manufacturing a film or a sheet is characterized in that the cutting unit is set up to be adjustable in the vertical direction to adjust its vertical position. Automated adjustment is preferred, which can be optimally matched to the determined thickness of the article of manufacture. In particular, once the thickness has been determined, the cutting unit can be adjusted exactly as far down in its vertical position as is currently required to cut another layer of film or another sheet of the desired thickness.

In accordance with another favourable embodiment, the system for manufacturing a film or a sheet is characterized in that the cutting unit is integrated into a cutting-unit holder, wherein the cutting-unit holder is connected to a stationary fixed machine stand. The cutting-unit holder is set up to pivot around an angle of inclination, in particular, from −5° to 30°, preferably from 0° to 7°, rotating around the latitudinal direction against the longitudinal direction and back. By tilting the cutting unit, the tool intended for cutting, such as the circumferential blade or a cutting wedge, can be optimally adjusted in relation to the thickness to be cut. This can also be done preferably depending on the thickness of the preliminary cut of the film or the sheet.

In accordance with another favourable embodiment, the system for manufacturing a film or a sheet is characterized in that a pressure roller is provided for pressing a surface of the source material against the vertical direction, wherein the pressure roller is arranged in front of the cutting unit as viewed in the longitudinal direction. The pressure roller makes a favourable contribution to a uniform quality of the cut film or sheet by continuously pressing down the source material to be cut just before the cut edge and preventing the cut film or sheet from lifting. Preferably, the pressure roller is integrated into the cutting-unit holder. If the height of the cutting-unit holder is adjusted, the pressure roller can also be adjusted automatically.

In accordance with another favourable embodiment, the system for manufacturing a film or a sheet is characterized in that the pressure roller is set up to be adjustable in the vertical direction, preferably separately and independently of the cutting unit. In this way, the pressure roller can also be adjusted independently of the cutting-unit holder, for example, in order to perform a targeted adjustment of the pressure roller even with larger desired film or sheet thicknesses. In addition, or as an alternative, the pressure roller can also be tilted at an angular offset to the vertical direction, for example, rotated a few degrees around the latitudinal direction against the longitudinal direction, being set up to be capable of adjusting upwards and downwards.

In accordance with another favourable embodiment, the system for manufacturing a film or a sheet is characterized in that the measurement device is relatively invariably connected to the pressure roller. This is particularly favourable because the pressure roller is regularly optimally orientated with the block material to be cut. Due to the relatively unchanging connection to the measurement device, the measurement-device position is also favourably adjusted simultaneously when the position of the pressure roller is adjusted. Since the pressure roller regularly has a minimal distance to the surface of the block material to be cut, the distance of the measurement device to the block material, i.e., to the measurement object, is also minimal and, above all, constant. It is favourable to achieve a better resolution of measured values and avoid linearity errors. Measurement sensors can be used, which only need to be able to map a very small measuring distance. Analogous to the pressure roller, the measurement device remains the same as a source material, and thus regularly optimally orientated with the source material.

In accordance with another favourable embodiment, the system for manufacturing a film or a sheet is characterized in that the measurement device is relatively invariably connected to the cutting-unit holder. In this embodiment, the measurement device is always favourably orientated with the cutting-unit holder in relation to the source material to be measured. The distance to the measurement object, i.e., to the block material, can thus be kept minimal and constant, wherein the linearity error can be avoided, and a better resolution of measured values can be achieved.

In accordance with another favourable embodiment, the system for manufacturing a film or a sheet is characterized in that the measurement device is independently stationary and fixed, or that the measurement device is relatively invariably connected to the machine stand. This ensures that the measurement device is arranged independently of the other regularly adjustable components of the system. The measurement device then regularly has a constant position and is not exposed to any vibrations of the components of the system caused by the manufacturing process of the film or the sheet, or to a much lesser extent. A favourable vibration decoupling can thus be achieved.

In accordance with another favourable embodiment, the system for manufacturing a film or a sheet is characterized in that the measurement device for measuring the source-material height, as viewed in the longitudinal direction, is set up and arranged in front of the cutting unit. A measurement-device position in front of the cutting unit has the advantage that the measurement device is arranged in the immediate vicinity of the measurement object in the form of the source material. Any other devices arranged behind the cutting unit for discharging the article of manufacture or a working area for manual removal of the cut sheet, for example, is irrelevant for the intended measuring process for the measurement device arranged in front of the cutting unit. The measurement can therefore be carried out particularly undisturbed in this catchment area of the system. Furthermore, the measurement device can be favourably connected to components of the system arranged here or the free space on the machine bench can be used for an independent system of a measurement device.

In accordance with a favourable embodiment, the method of operating a system for manufacturing a film or a sheet is characterized in that, depending on the result of the method of determining the thickness of the film or the sheet in relation to a preceding layer, the cutting unit is adjusted with respect to its position in relation to the source material, in particular, in the vertical direction, in order to cut a subsequent layer. Such feedback during the operation of the system can ensure a constant and high quality of the cut film and sheet, particularly with regard to tolerance of the desired thickness of the article of manufacture.

In accordance with a favourable embodiment, the method of operating a system for manufacturing a film or a sheet is characterized in that the source-material length is measured in the longitudinal direction by means of the measurement device. It is therefore favourable that a plurality of measuring tasks can be fulfilled by one measurement device. It is no longer necessary to provide separate measurement devices to measure the thickness of the article of manufacture on the one hand and the source-material length on the other hand, which significantly reduces the technical and operating effort involved. In principle, the measurement device can be used to detect the position of the block. This also favourably reduces the system engineering effort, because in prior art, light barriers are often used for such tasks, which can now be dispensed with.

In accordance with a favourable embodiment, the method of operating a system for manufacturing a film or a sheet is characterized in that a conveying speed of the source material is adjusted depending on the position of the source material detected by the measurement device. In this way, the manufacturing speed can be significantly increased. The intended measurement device can also be used to determine whether the source material is currently in a position in which it is being cut, which regularly requires more moderate conveying speeds. If it is determined that the source material is not currently arranged in a position that is in contact with the cutting unit, then the conveying speed can be significantly increased in order to convey the remaining block material, for example, which has now been cut, back into a position for the subsequent cut. In addition, this block position detection can also be used to favourably regulate cutting in and out. In this way, the cut can be started regularly by slowly retracting the block material against the cutting tool, while then the conveying speed can be increased to carry out the cut, and ultimately, the conveying speed can be reduced again to ensure a moderate extension of the block material from the engagement with the cutting tool. In this way, force peaks are favourably reduced when extending and retracting the blade for it to engage.

In accordance with a favourable embodiment, the method of operating a system for manufacturing a film or a sheet is characterized in that a vertical position of the cutting unit is adapted depending on the position of the source material detected by the measurement device. As a result, the operational reliability of the system can be increased, because the cutting unit can, for example, be automatically raised in a targeted manner when the source material is moved back to an starting position in the opposite longitudinal direction. In this way, an undesirable collision between the block material and the cutting unit can be avoided, wherein this can be done automatically, as the position of the block material can be detected via the measurement device. Such block position detection means that light barriers, which are often provided for in prior art, can be dispensed with and the effort of the system can be reduced with regard to the components used.

In principle, the measurement device can detect in its specific measuring range whether the source material is currently in its measuring range or not. Therefore, in order to record the exact position of the source material, it can be necessary to know other values such as the conveying speed and/or the source-material length, in order to record the current position via an evaluation unit, for example. Such an evaluation unit can be connected to a control unit of the system in order to implement the described steps for operating the system, for example, adjusting the vertical position of the cutting unit or also the conveying speed.

In accordance with a favourable embodiment, the method for operating a system for manufacturing a film or a sheet is characterized in that the film is removed from the system after cutting, preferably continuously, or that the sheet is removed from the system after cutting.

Figure 2:
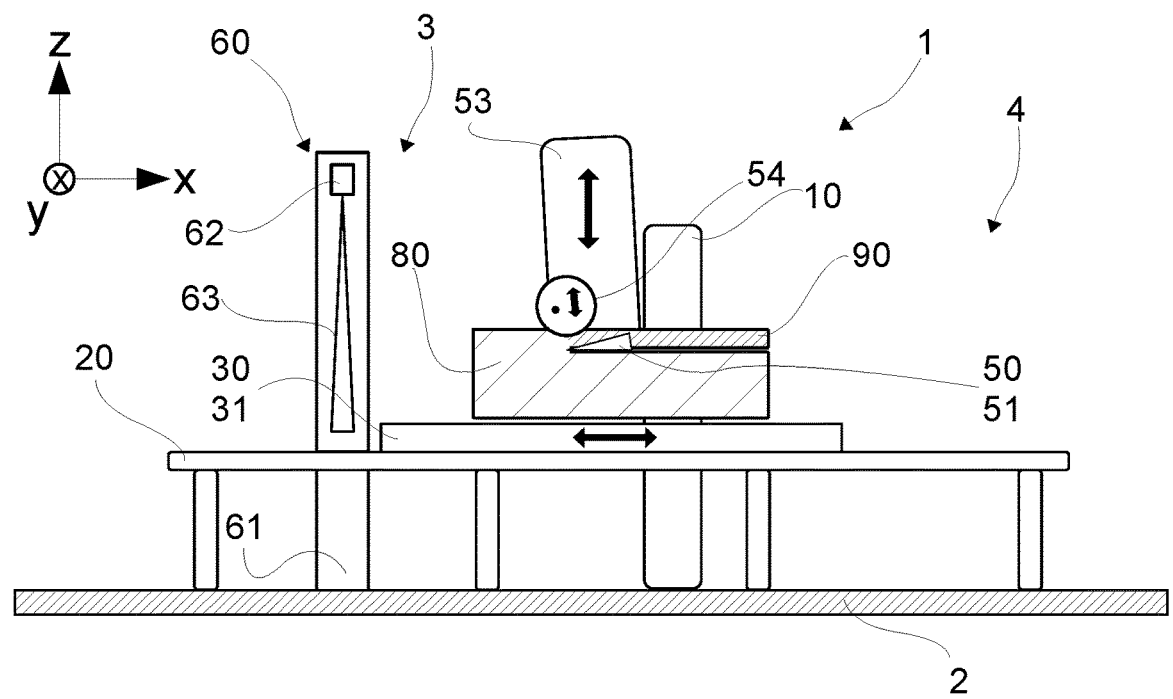
Figure 3:
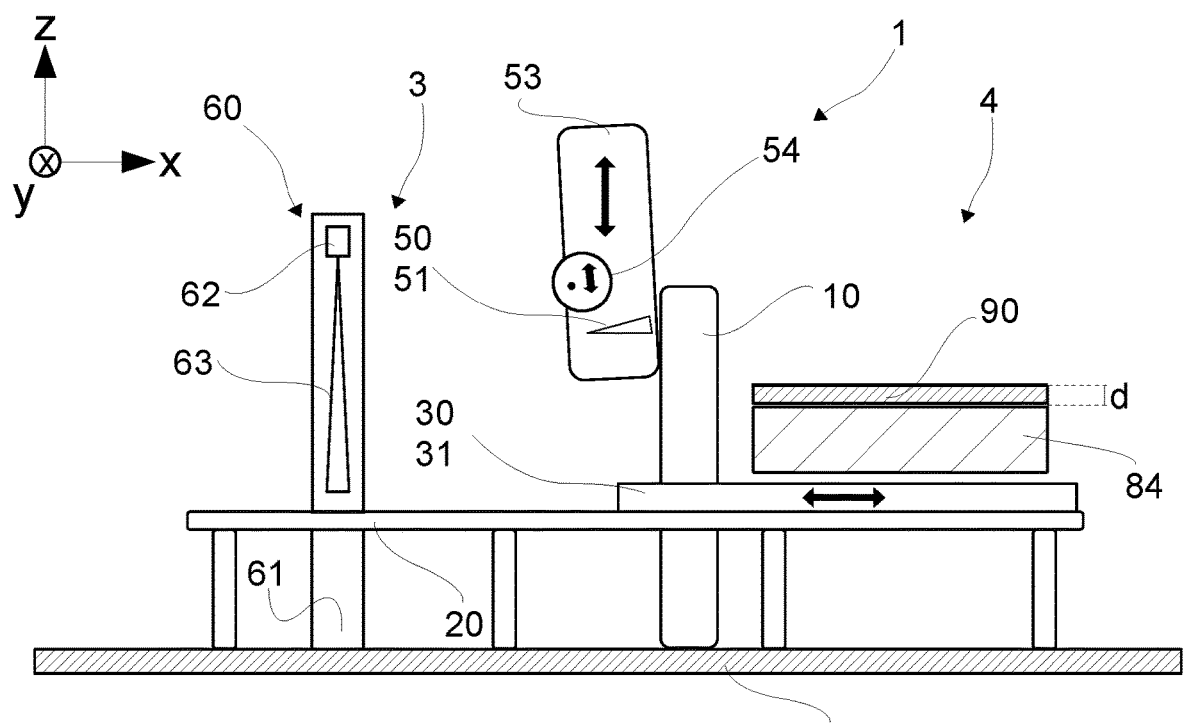
Figure 4:
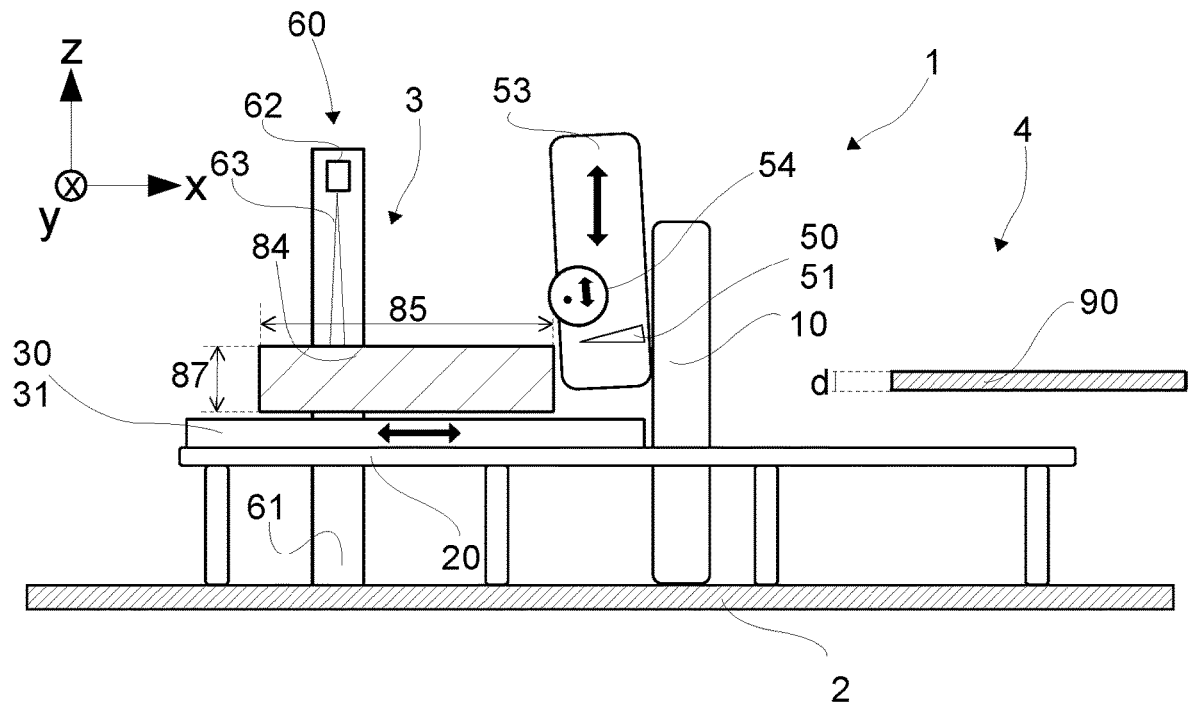
Figure 5:
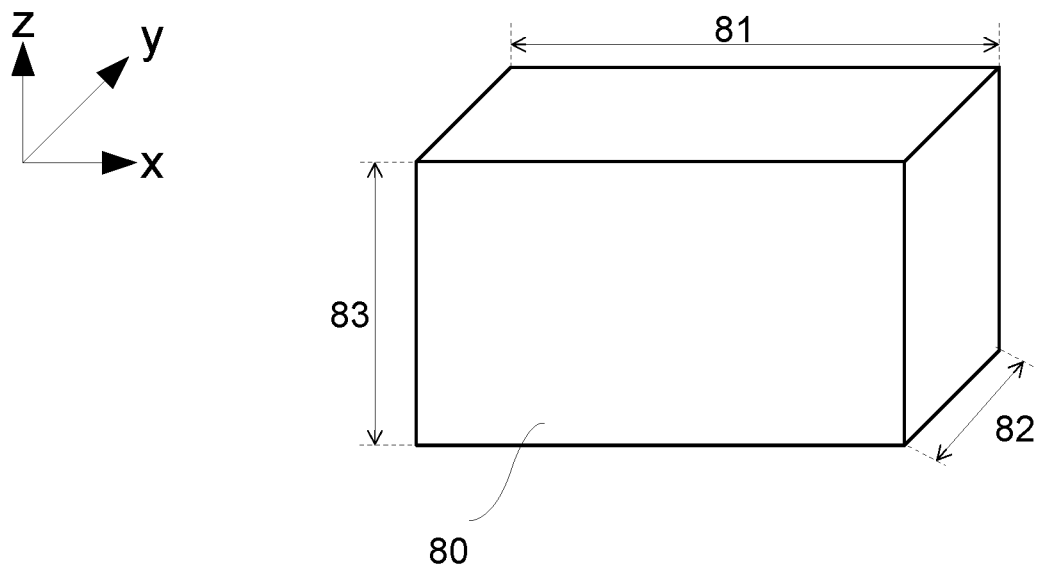
Figure 6:
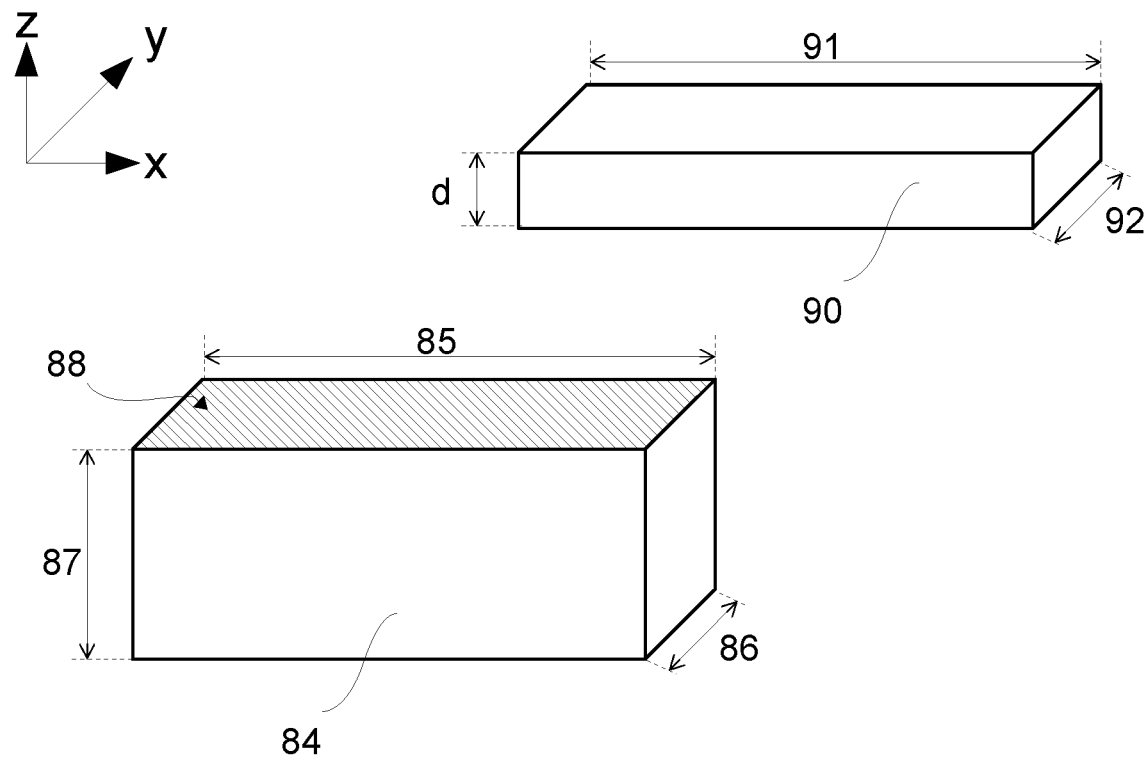
Figure 7:
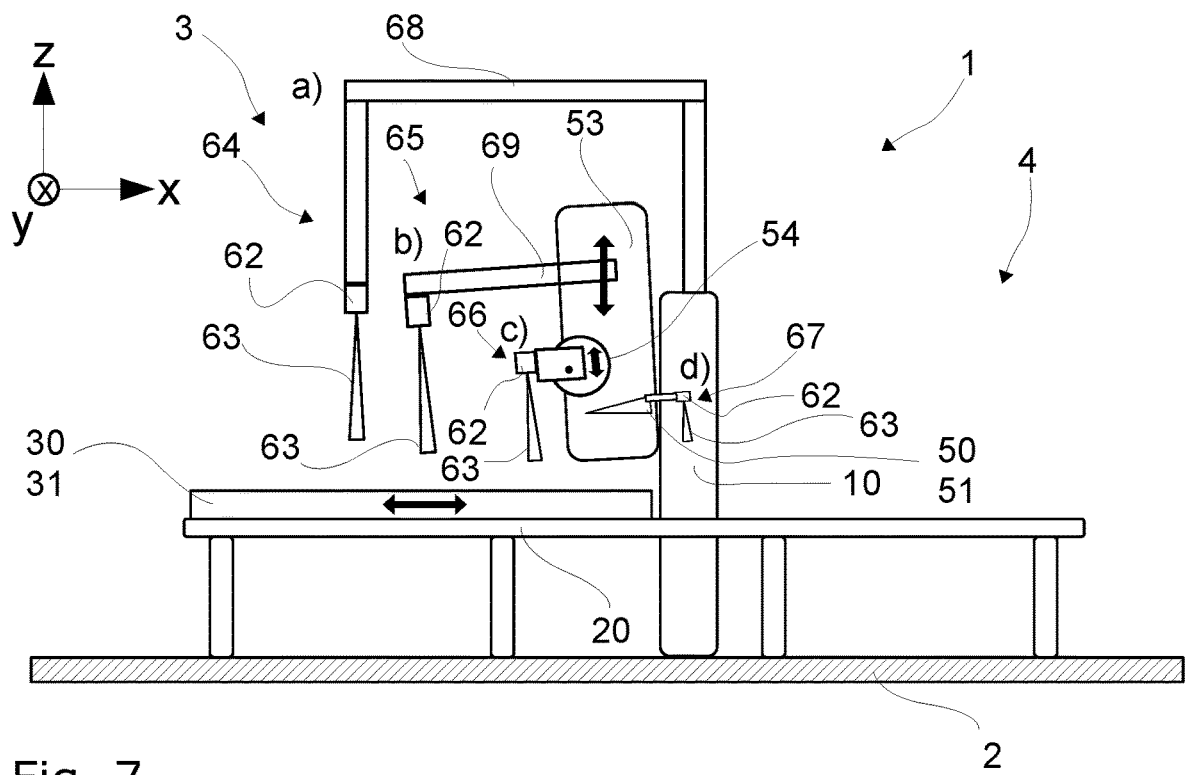
Figure 8:
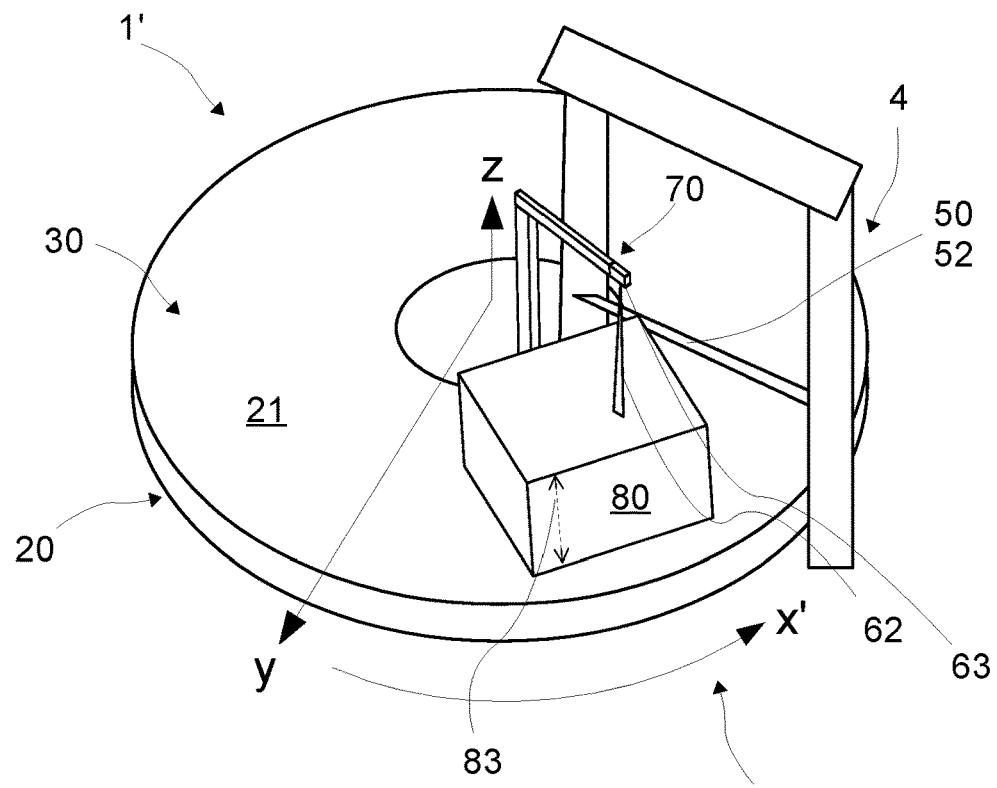
Figure 9:
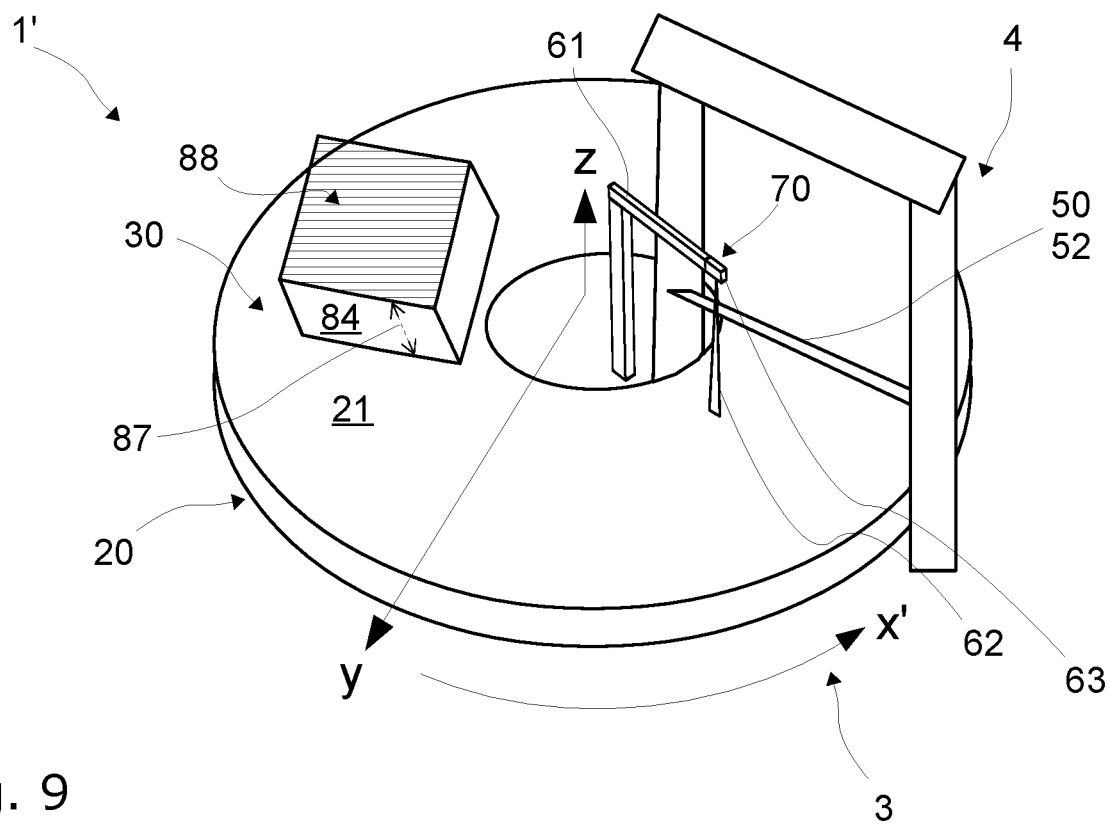
Figure 10:
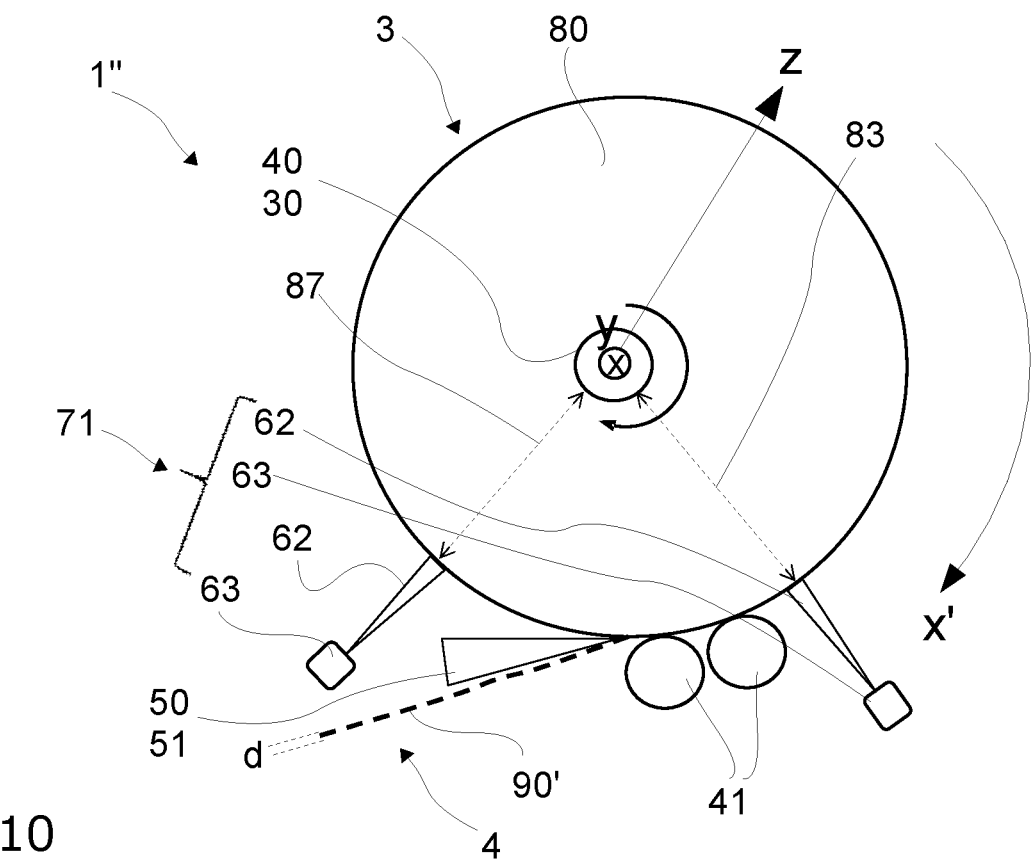

Further favourable and preferred embodiments result from the following description with reference to the figures. The figures, which only reflect exemplary embodiments, show:

FIG. 1 a system for manufacturing a sheet made of a block material in a schematic lateral view in a first state shortly before a first cut of a sheet from the block material;

FIG. 2 the system of FIG. 1 in a second state during the first cut of a sheet from the block material;

FIG. 3 the system from FIG. 1 in a third state shortly after the first cut of a sheet from the block material;

FIG. 4 the system from FIG. 1 in a further state after the first cut of a sheet from the block material and shortly before a further cut of another sheet from the cut remaining block material;

FIG. 5 a block material as a source material in a schematic perspective view;

FIG. 6 the block material from FIG. 5 after a cut, split into a sheet and into the cut remaining block material;

FIG. 7 further exemplary embodiments of a system as shown in FIG. 1 in a schematic lateral view;

FIG. 8 another exemplary embodiment of a system for manufacturing a sheet made of a block material in a schematic perspective view in a first state shortly before a first cut of a sheet from the block material;

FIG. 9 the system from FIG. 8 in a further state after the first cut of a sheet from the block material with the cut remaining block material; and FIG. 10 a system for manufacturing a film sheet made of a block material in a schematic lateral view.

FIG. 1 shows the system 1 for manufacturing a film or a sheet 90 schematically in a lateral view. The same system 1 is shown in the same view in different states with regard to the manufacturing status of a film or a sheet 90 in FIG. 2 to FIG. 4. In the exemplary embodiment shown here, which is therefore the preferred embodiment, the article of manufacture is a sheet 90. The sheet 90 is shown as an example in FIG. 4 on the right, wherein the sheet 90 of the system 1 is discharged as an article of manufacture. In addition, the sheet 90 is also shown in FIG. 2 as a partially finished partial product, as well as in FIG. 3 as a finished article of manufacture resting on a residue of the source material (cut remaining block material 84). For example, the step of removing the sheet 90 as an article of manufacture from the system 1 can be done manually or automatically, for which the system 1 can also have a removal device for removing a film or a sheet 90 that is not shown.

As an alternative to manufacturing sheets 90, the system 1 can also be set up for manufacturing films, wherein the films can, for example, be continuously discharged. The manufacturing a film is shown by way of example in FIG. 10, which shows a further embodiment of a system 1" for manufacturing a film or a sheet in relation to the film 90' indicated by a dashed line. In the following, however, the invention is mainly described using the example of manufacturing sheets 90, wherein the advantages can also be transferred to manufacturing films 90'.

The system 1 is equipped for manufacturing sheet 90 made of a block material 80. The block material 80 is the source material of the manufacturing process, wherein the block material 80 in the exemplary embodiment shown here and thereby being preferred is a foam block.

The block material 80 has a source-material length 81, which extends in the longitudinal direction x. In addition, the block material 80 has a source-material width of 82 extending in the latitudinal direction y and a source-material height of 83 extending in the vertical direction z. The directions mentioned are based on the orientation of the system 1 itself. A corresponding coordinate system is shown in FIG. 1 to FIG. 4. The dimensions of the block material 80 mentioned—source-material length 81, source-material width 82, source-material height 83—are based on this coordinate system. A foam block as block material 80 is shown as an example in FIG. 5 in a perspective view in the uncut state to illustrate these dimensions. Furthermore, FIG. 6 shows a perspective view of a foam block that has already been cut, i.e., the remaining block material 84 that has been cut, and a cut sheet 90, wherein the cut surface 88 of the remaining block material 84 is indicated with hatching. The remaining block material 84 cut has corresponding dimensions, namely source-material length 85, source-material width 86, source-material height 87. These dimensions are also referred to as "source-material dimensions" because the cut remaining block material 84 can again be provided as a source material for a subsequent further cut of a sheet 90 (see FIG. 4). The source-material lengths 81 or 85 and the source-material widths 82 or 86 of the block material 80 or the cut remaining block material 84 are usually the same size. The source-material height 83 of the source material before cutting (block material 80) is of course greater than the source-material height 87 of the source material after cutting, i.e., the cut remaining block material 84. Specifically, the source-material height 87 is smaller than the source-material height 83 by the thickness d of the sheet 90.

The dimensions can be viewed in FIG. 5 and FIG. 6, as well as partially in the block material 80 arranged on the system 1 and the remaining block material 84 cut. For the sake of clarity, however, those dimensions have not been designated in FIG. 2 and FIG. 4.

It should be noted that the dimensions do not always run optimally along the directions described and orientated to the system 1—longitudinal direction x, latitudinal direction y, vertical direction z—, in particular, not the source-material length 81 and the source-material width 82. However, as shown here, a rectangular foam block is regularly used as block material 80, the length, width and height of which runs along the longitudinal direction x, latitudinal direction y, and vertical direction z. Where applicable, however, a certain predetermined inclination of the rectangular block material 80 can also be desired, particularly in the case of harder source material so that the source-material length 81 of the cuboid block material 80 may not run perfectly along the longitudinal direction x, but slightly inclined to it, and the source-material width 82 may not run perfectly along the latitudinal direction y, but slightly inclined to it. If such an inclination is desired and deliberately carried out, it can also be taken into account in the measurement tasks described below.

Basically, the longitudinal direction x runs along a support table 20 of the system 1, on which the block material 80 is to be positioned for manufacturing the film or the sheet 90. The block material 80 can be conveyed along the longitudinal direction x. In this respect, the longitudinal direction x can also be referred to as the conveying direction. For this purpose, the system 1 comprises a conveyor unit 30. Furthermore, the longitudinal direction x can also be referred to as the direction of production since the sheet 90 to be manufactured is also produced along the longitudinal direction x with regard to the manufacturing process. In this respect, the system 1 can in principle also be divided into two areas, namely a catchment area 3 and a discharge area 4 (FIG. 1 to FIG. 4 and FIG. 7). The source material is provided in catchment area 3, which is cut in the form of sheet 90 on the system 1 for the article of manufacture. Accordingly, the area in the direction of production behind a corresponding cutting unit 50 is the discharge area 4, in which the finished sheet 90 is then discharged.

In the exemplary embodiment shown in FIG. 1 to FIG. 4, the conveyor unit 30 is designed as a moveable, driven support carriage 31. The support carriage 31 can be moved back and forth in the longitudinal direction x, as indicated by the double arrow in the support carriage 31. The speed of the conveyor unit 30 or the support carriage 31 in the longitudinal direction x can also be referred to as the feed speed or conveyor speed. The support carriage 31 provides an essentially flat contact surface for the support of the block material 80. The contact surface extends in the horizontal plane spanned by the longitudinal direction x and the latitudinal direction y. The contact surface can also be formed by a perforated sheet, together with a cavity arranged in front of the contact surface as viewed in the vertical direction z, in which a negative pressure, for example, a technical vacuum, is set up. In this way, it can be ensured that the regularly soft block material 80 rests stably and firmly on the contact surface and does not slip, even if the cutting process of the block material 80 described later occurs.

The latitudinal direction y is generally perpendicular to the described longitudinal direction x and perpendicular to the conveying direction along which the block material 80 is conveyed for the purpose of cutting in the system 1. The latitudinal direction y and the longitudinal direction x span a horizontal plane, which runs regularly parallel to hall floor 2, on which hall floor 2 system 1 is regularly placed as intended.

The vertical direction z, in turn, is the third perpendicular direction in the sense of a Cartesian coordinate system, as can be seen from the exemplary embodiments in accordance with FIG. 1 to FIG. 4 (and FIG. 7). The vertical direction z runs vertically from the hall floor 2 upwards. Along the vertical direction z runs the height of the block material 80, i.e., the source-material height 83, which is of central interest for the present invention. According to the proposal, it is necessary to determine a thickness d of the produced film or sheet 90, which thickness d basically corresponds to the extension of the cut film or sheet 90 in the same vertical direction z. Since the Cartesian coordinate system is based on the system 1 itself, as described, this naturally applies in the event that the produced, i.e., cut, sheet 90 rests on the support table 20, for example. If the sheet 90 is changed in its orientation or position, or is transported away, it can also be that the thickness d to be determined no longer extends in the vertical direction z.

FIG. 8 and FIG. 9 show an alternative system 1' for manufacturing a film or a sheet 90. Another alternative system 1" is shown in FIG. 10. Whereas the system 1 in FIG. 1 to FIG. 4 as well as in FIG. 7 are designed as a reversing table with a support carriage 31 that can be moved back and forth in the longitudinal direction x; the system 1' in FIG. 8 and FIG. 9 is designed as a rotary table with a round support table 20.

The system 1 in accordance with FIG. 1 to FIG. 4 and FIG. 7 comprises a support table 20 designed as a linear machine table. This linear machine table comprises the conveyor unit 30 and is set up for the support of the source material. The conveyor unit 30 is set up on the support side of the linear machine table (support table 20) along the longitudinal direction x and backwards in a reversing manner against the longitudinal direction x.

The system 1' in accordance with FIG. 8 and FIG. 9 has a support table 20 designed as a rotary table, which support table 20 comprises the conveyor unit 30 and is set up for the support of the source material. In the exemplary embodiment shown, the conveyor unit 30 itself is formed by the support table 20, wherein the conveyor unit 30 is designed as a circumferential contact surface 21 of the rotary table and is set up to be circumferentially moveable along the longitudinal direction x'. In principle, it is also possible to set up the depicted rotary table also in a reversing manner against the longitudinal direction x'. The rotary table can also be equipped with a perforated sheet on the support side, in front of which, as viewed in the vertical direction, a vacuum can be applied in order to keep the source material positionally and firmly on the rotary table.

The support table 20 in accordance with FIG. 8 and FIG. 9, which is designed as a rotary table, provides the contact surface 21 for the block material 80 to be cut. The support table 20 is designed as a circular ring and can be moved in the circumferential direction of the circular ring. In this respect, the moveable part of the support table 20 in the system 1' in FIG. 8 and FIG. 9 also forms the conveyor unit 30 of the system 1' simultaneously. Accordingly, in the exemplary embodiment in accordance with FIG. 8 and FIG. 9, a different system of directions is used than in FIG. 1 to FIG. 4 and FIG. 7: The reference x' indicates the circumferential direction as the longitudinal direction x'. The support table 20 can move along this longitudinal direction x', which is why the longitudinal direction x' can also again be referred to as the conveying direction as well as the direction of production of the sheet 90 or film. The vertical direction z extends vertically upwards again from the hall floor, which is not shown or not designated. In the vertical direction z, the thickness of the cut film or sheet 90 must be specified again. Furthermore, the latitudinal direction y is orientated towards the radial direction of the support table 20, which is designed as a rotary table.

FIG. 10 also shows a coordinate system for orientation that deviates from the Cartesian coordinate system and is similar to that in FIG. 8 and FIG. 9. The system 1" shown in the exemplary embodiment of FIG. 10 does not have a support table 20, but rather the source material 80 is arranged as a round block on a central roller 40. The system 1" in accordance with FIG. 10 therefore has the central roller 40 for receiving the source material formed as a round block. The conveyor unit 30 of the system 1" is designed by the central roller 40 itself in such a way that the central roller 40 can be driven in the direction of rotation to convey the source material. The direction of rotation of the central roller 40 is the same as the indicated longitudinal direction x'.

The central roller 40 of the system 1" is therefore a driven roller which can convey the block material 80 circumferentially along the longitudinal direction x', as indicated by the central arrow in the central roller 40. In this respect, the central roller 40 in the case of the system 1" in FIG. 10 also forms the conveyor unit 30 of the system 1" and actively conveys the block material 80 itself. The central roller 40 and thus the block material 80 can alternatively be passively driven by the provision of the round block driven, separate drive rollers 41. The system of directions is again based on the system 1": the longitudinal direction x' runs according to the conveying direction of the driven central roller 40 or along the circumference of the source material formed as a round block 80; the latitudinal direction y is perpendicular to the longitudinal direction x', in FIG. 10 into the drawing plane; the vertical direction z is radial from the centre in the form of the centre of the central roller 40.

The directions shown in FIG. 8 and FIG. 9 as well as in FIG. 10 in the sense of the respective non-Cartesian coordinate system represent only an exemplary momentary snapshot. These are local coordinate systems. In principle, the moment or point in the respective system 1' or 1" in which the film 90' or sheet 90 was just cut is of interest. This is because the present invention has special advantages in determining the thickness d of the cut film 90' or sheet 90.

In the exemplary embodiment in accordance with FIG. 10, the source-material height 83 corresponds to the wall thickness of the hollow cylinder block material 80. The source-material height 83 is thus indicated in the radial direction with respect to the round block and in FIG. 10 as viewed in the direction of rotation (longitudinal direction x') shortly before the cutting unit 50 by means of the dashed double arrow. In this respect, the vertical direction z is also the radial direction of the source material 80, which is available as a hollow cylinder. The source-material height 87 after cutting the block material 80, i.e., as viewed in the longitudinal direction x' just behind the cutting unit 50, is also indicated by a dashed double arrow. The illustration of block material 80 is only exemplary in FIG. 10. Even if it appears that the source-material height 83 before the cutting of the block material 80 and the source-material height 87 after the cutting of the block material 80 are the same, in reality, the subsequent source-material height 87 after cutting is always reduced by the thickness d of the film 90' compared to the preliminary source-material height 83 before the cutting of the block material 80.

The source-material width of the block material 80 (not shown) in FIG. 10 corresponds to the height of the hollow cylinder, which represents the geometrical shape of the source material 80. The source-material length, on the other hand, is not relevant for the exemplary embodiment in accordance with FIG. 10. It can be regarded as the circumferential source-material length 80, which is designed as a round block and thus as a hollow cylinder. In the exemplary embodiment of FIG. 10, in contrast to the preceding systems 1 or 1' of FIG. 1 to FIG. 4, or FIG. 7, or FIG. 8 and FIG. 9, not a sheet 90 but a film 90' is produced as the article of manufacture on the system 1". The film 90' is indicated by the dotted line in FIG. 10 and is produced continuously until the source material 80 in the form of the round block 80 is used up. In this respect, the film 90' is produced almost endlessly, or to be more specific, the film 90' has a length that corresponds to a multiple of the circumference or the source-material length 80, which is designed as a round block.

The described orientations of the dimensions source-material length 81, source-material width 82, as well as a source-material height 83 in relation to the three directions longitudinal direction x or x', latitudinal direction y, and vertical direction z refer primarily to the condition of the block material 80 or the cut film or sheet 90 immediately after or before or during the cutting process. At the moment when the block material 80 has just been cut, as shown by way of example in FIG. 3, the cut sheet 90 rests on the cut remaining block material 84 as viewed above in the vertical direction z. The dimensions of the height, width and length, both of the sheet 90 as well as of the cut remaining block material 84, which is available in a subsequent pass as new block material to be cut, are then orientated in this state shown in FIG. 3 as precedingly described along the three directions longitudinal direction x or x', latitudinal direction y, and vertical direction z.

As a general rule, the following method is followed for manufacturing a film 90' or sheet 90 for all of the systems 1, 1', 1" shown in accordance with FIG. 1 to FIG. 4, FIG. 7, FIG. 8, FIG. 9, or FIG. 10: The source material provided as block material 80 is processed in such a way that the film 90' or the sheet 90 as the article of manufacture is cut out of the block material 80 along the longitudinal direction x or x'. For this purpose, the block material 80 is conveyed along the longitudinal direction x or x' to a cutting unit 50 for cutting the source material. The conveyor unit 30 ensures the conveyance of the block material 80 to the cutting unit 50. For the cutting itself, the source material 80 is then passed by this cutting unit 50 or by a cutting tool integrated in the cutting unit 50, wherein the film 90' or the sheet 90 is cut out of the block material 80 along the longitudinal direction x or x'.

As indicated in FIG. 1 to FIG. 4, or FIG. 7, as well as in FIG. 10, the cutting unit 50 may have a cutting wedge 51, which the block material 80 is passed by with the aid of the conveyor unit 30. As known from prior art and described at the beginning, a circumferential blade can be guided in the cutting wedge 51. The alternative cutting tools mentioned above are also generally applicable to the systems 1, 1', 1" shown.

The cutting unit 51 splits the block material at its top side, resulting in the cut-off film or sheet 90, which is peeled off the block material. The tip of the cutting wedge 51 points in the opposite longitudinal direction x to the block material to be cut 80 (FIG. 1 to FIG. 4 and FIG. 7) or tangentially to the block material 80 in accordance with FIG. 10, which is designed as a round block.

In addition, as indicated in the further exemplary embodiment of the system 1' in FIG. 8 and FIG. 9, the cutting unit 50 can also be designed as a circumferential blade 52 without support in a cutting wedge, but, for example, only guided between an upper and a lower brace. The circulating blade 52 is also continuously driven according to the principle of a rotating saw. The circulating blade 52 moves in relation to the system 1' in a radial direction, i.e., as viewed in the latitudinal direction y, and thus transversely to the block material to be cut 80 fed to the cutting unit 50 and the circulating blade 52. Sawing or wire cutting can also be used.

The film 90' or the sheet 90 is cut out of the block material conveyed along the longitudinal direction x or x' by means of the cutting unit 50 along the longitudinal direction x or x'.

Cutting unit 50 is integrated into a cutting-unit holder 53 in accordance with FIG. 1 to FIG. 4 (as well as FIG. 7) in the system 1. The cutting-unit holder 53 is, in turn, connected to a machine stand 10. The machine stand 10 is stationary and permanently connected to the hall floor 2.

In the exemplary embodiment presented here, and in this respect the preferred exemplary embodiment, the cutting unit 50 is set up to be adjusted in the vertical direction z in order to be capable of adjusting the vertical position of the cutting unit 50, in particular, the cutting wedge 51. For this purpose, the cutting-unit holder 53 can be moved forward and backwards in the vertical direction z, as indicated by the double arrow in the cutting-unit holder 53.

The adjustability of the vertical position of the cutting unit 50 is necessary in order to also be able to produce a plurality of sheets 90 or, alternatively, a plurality of layers of film 90' from the source material in the form of the block material 80. For example, the source-material height of 83 or 87, i.e., the height of the block material 80, decreases with each cut layer. As a result, it is necessary to track the cutting unit 50 downwards in the opposite vertical direction z so that another layer of a film 90' or another sheet 90, for example of the same thickness d, can be cut out.

In order to keep the quality high during the cutting process itself, a pressure roller 54 is also provided for pressing the surface of the source material formed as block material 80 in the vertical direction z against the vertical direction z. As a result, the block material 80 is held downwards in the opposite vertical direction z. The block material 80 cannot therefore stand out from the support table 20 or the support carriage 31 since the pressure roller 54 ensures a counter-holding downwards. This is particularly important because the cutting unit 50 in general, or in this case the cutting wedge 51, exerts relevant forces on the block material 80 during cutting.

The pressure roller 54 is a driven roller in the exemplary embodiment shown here, which is therefore preferred. This also supports the conveyance of the block material 80 and thus also of the cut sheet 90 in the longitudinal direction x, i.e., in the direction of production, by the pressure roller 54.

The pressure roller 54 is arranged, as viewed in the longitudinal direction x, in front of the cutting unit 50. In this context, the arrangement in the longitudinal direction x in front of the cutting unit 50 refers to the fact that the section of the pressure roller 54 acting on the block material 80, i.e., where there is contact between the pressure roller 54 and the upper surface of the block material 80, is arranged in front of the operative section of the cutting unit 50: i.e., in front of the tip of the blade in the cutting wedge 51. The feature does not mean that the entire extension of the pressure roller 54 in the longitudinal direction x must be in front of the entire cutting unit 50. Rather, in the present case, and in this respect, the pressure roller 54 is preferably integrated into the cutting-unit holder 53, into which cutting-unit holder 53 the cutting unit 50 is also integrated.

In addition, the pressure roller 54 is also set up to be adjustable in the vertical direction z, as indicated by the double arrow in the pressure roller 54. In the exemplary embodiment of the system 1 in accordance with FIG. 1 to FIG. 4 (also like in the case of the system 1 in accordance with FIG. 7) shown here and thereby being preferred, the pressure roller 54 is separated in the vertical direction z and is set up independently of the cutting unit 50, which is also adjustable in the vertical direction z. In this way, different sheets 90 or also films 90' of different thicknesses can be manufactured as flexibly as possible on the same system 1 by simply adjusting the vertical position of the pressure roller 54 or the pressure roller 54 in relation to the cutting unit 50.

It is also possible for the pressure roller 54 to be adjustable in an angular offset to the vertical direction z. Rotating at a small angle around the latitudinal direction y against the longitudinal direction x, the pressure roller 54 can then not be moved exactly along the vertical direction z, but up or back down by this small angular offset. In this way, the position of the 54 pressure roller can also be adjusted in the x-direction, i.e., in the longitudinal direction x.

By adjusting the vertical position of the 54 cutting-unit holder and thus also all the other components integrated into it, the process for manufacturing 90' films or 90 sheets can be improved. For example, cutting-unit holder 54 can initially assume a first vertical position, which is optimized to the desired thickness d of the article of manufacture in the form of film 90' or sheet 90. After successful cutting of sheet 90, the cutting-unit holder 54 can then be moved up in the vertical direction z to assume a second, higher vertical position. The remaining block material 84 can then be quickly moved back as viewed against longitudinal direction x, to the front of cutting unit 50. Since there is no risk of collision between the cutting unit 50 or cutting wedge 51 and the cut remaining block material 84 due to the upwardly shifted cutting-unit holder 54, the travel speed of the support carriage 31 can also be set very high against the longitudinal direction x. In addition, when the block material 80 is returned to its starting position in front of the cutting unit 50, it is no longer necessary to guide the block material 80 at a specified ideal and rather moderate feed speed adapted to the cutting process for a further, subsequent cutting process. By specifically adjusting the feed speed of the support carriage 31, for example, if the cutting unit 50 is moved to a higher vertical position, the manufacturing speed of the overall process can be considerably increased.

As can be seen from the angle of inclination a shown only in FIG. 1, the cutting-unit holder 53 can be pivoted by an angle of inclination a around the latitudinal direction y against the longitudinal direction x and back, i.e., again in the longitudinal direction x. In the illustration in accordance with FIG. 1, the cutting-unit holder 53 can therefore be pivoted back counterclockwise from an upright orientation around the angle of inclination a as shown. It is also possible to pan clockwise back to a perfect upright alignment that is not shown. The cutting-unit holder 53 can be pivoted between −5° and +30° at the angle of inclination a, measured between the vertical direction z back against the longitudinal direction x, as shown in the figure. The state of −5° (not shown) refers to a pivot of the top side of the cutting-unit holder 53 from the state shown in FIG. 1 in the longitudinal direction x to beyond the vertical direction z, namely by 5°.

The pivoting of the cutting-unit holder 53 means that the cutting unit 50 is also pivoted and thus the cutting instrument, i.e., the cutting wedge 51 with a circumferential blade, can be adjusted at an angle. This is favourable depending on the block material to be cut 80, in particular, its hardness, as well as the parameter of the desired thickness d of the sheet to be cut 90 or also the film 90'.

Even though the angle of inclination a is indicated only within the scope of FIG. 1, the cutting-unit holder 53 is inclined by the angle of inclination a in FIG. 2 to FIG. 4 as well as in FIG. 7.

In principle, it is well known that the cutting process or the entire manufacturing process of the film 90' or sheet 90 is subjected to quality control. It is customary to check the thickness d of the film produced 90' or sheet 90, for example to see whether the film 90' or sheet 90 has the desired thickness d. To illustrate, FIG. 5 shows the block material 80 as a source material with its original dimensions source-material length 81, source-material width 82, and source-material height 83, while FIG. 6 shows the cut remaining block material 84 with the resulting dimensions after a single cutting process to manufacture the single sheet 90 source-material length 85, source-material width 86, and source-material height 87. Furthermore, in view b) the cut single sheet 90 is shown together with its dimensions in the form of the thickness d, the sheet length 91, and the sheet width 92.

Quality control, particularly of the thickness d of the cut sheet 90 or also the film 90' can be crucial. For example, in the case of continuous manufacture of a plurality of sheets 90 or continuous film 90', the cutting unit 50 or the corresponding cutting tool (e.g., the cutting wedge 51 or the circumferential blade 52) must be adjusted regularly. For example, the block material 80 as a source material changes its source-material height 83 or 87 with each cut off layer in the form of a sheet 90 or a layer of film 90'. This can be seen by the overview of FIG. 1 with FIG. 4, wherein, in FIG. 1, the source material still has a source-material height 83, while in FIG. 4, after cutting off the sheet 90 shown on the right, the cut remaining block material 84 now only has a source-material height 87, which is lower than the source-material height 83. Accordingly, the cutting unit 50 or the cutting wedge 51 in FIG. 4 must be set lower during the subsequent cutting process than precedingly during the initial cutting process in accordance with the arrangement in FIG. 1.

In order to cut a plurality of sheets of 90 or a plurality of layers of film 90' from a single block material 80 as a source material, values are regularly given to the system 1, 1', 1" or a corresponding control unit at the beginning in order to determine which values the cutting unit 50 is to be adjusted (i.e., lowered regularly) so that a plurality of sheets 90 of the same thickness d or one film 90' with a uniform thickness d can be cut. The determination of the actual thickness d of the cut sheet 90 or film 90' can then serve to prevent a consequential error. This is because if a sheet 90 is in reality cut thinner than originally desired and adjusted accordingly, and then the cutting unit 50 is only adjusted accordingly, this can lead to consequential errors and, under certain circumstances, to the fact that all sheets 90 have too little thickness d after cutting. If, however, the actual thickness d of the cut sheet 90 is checked, then the adjustment of the cutting unit 50 can be adjusted accordingly in the case of a sheet 90 or film 90' that is cut too thin or also too thick.

The present invention provides a remedy and brings advantages in quality control and automation of the process of production of the 90' film and 90 sheet respectively. Thus, in the present case, it is proposed that the thickness d of the film 90' or sheet 90 is no longer determined in such a way that the film 90' or sheet 90 is measured directly on the film as the article of manufacture. Rather, the thickness d of the film 90' or sheet 90 is determined by first measuring the preliminary source-material height 83 before cutting the block material 80 and then the subsequent source-material height 87 after cutting the block material 80, and then by determining the thickness d of the film 90' or sheet 90 to be determined from the difference between the preliminary source-material height 83 minus the subsequent source-material height 87. The measurement of the subsequent source-material height 87 after the cutting of the block material 80 corresponds to the measurement of the height of the cut remaining block material 84 in the vertical direction, e.g.

In accordance with the proposal, an indirect measurement method is therefore be provided. It is no longer measured directly on the article of manufacture to be measured, namely the film 90' or sheet 90. As a result, many disadvantages associated with a direct measurement method on the product can be avoided. For example, in prior art, when discharging film 90' or the sheet 9 by means of discharge devices, it is possible to impact the film 90' or the sheet 90, which is regularly formed from soft foam material. Too much pulling on the film 90' or sheet 90, for example, can lead to thinning of the article of manufacture. In accordance with this, if measurements were taken at such a point, a thinner thickness would be determined than the actual thickness d of the film 90' or sheet 90 to be determined. The proposed method and the described and thus preferred exemplary embodiments in systems 1, 1', 1" do not have such disadvantages. In the case of the systems 1, 1' and 1", it is also favourable to dispense with the need for elaborate additional devices, which is used, for example, to guide the material of the produced film 90' or sheet 90 in order to obtain correct measurement results in the case of direct measurement of this film 90' or sheet 90. For example, it is not necessary to determine the sheets for the systems 1, 1', 1" shown.

In addition, the systems 1, 1', 1' shown and the proposed method are much more flexible as regards manufacturing completely different films 90' or sheets 90 on the same system 1, 1' and 1". Thus, the direct measurement methods of prior art, which are directly aimed at the article of manufacture to be measured, are also set up for the respective article of manufacture in the form of film 90' or sheet 90, in particular, with regard to their expected thickness d. The optical measurement devices, for example, are calibrated to the expected thickness. When changing from a first film thickness to a second, for example, larger film thickness, a time-consuming adjustment of the method and even of the systems 1, 1', 1" is regularly necessary. Since, however, as shown in the present case, it is no longer the article of manufacture that is measured, but rather the source material in the form of the block material 80 and the thickness d of the produced film 90' or sheet 90 is detected by calculating the difference, these disadvantages of prior art do not apply. Even in manufacturing completely different thicknesses of films 90' or sheets 90, the framework conditions for measuring the source material in the form of the block material 80 are similar. On the one hand, the dimensions of the block material 80 used can regularly be known in advance and the optical measuring methods can be specifically adapted to these general conditions, even if films of different thicknesses 90' or sheets 90 are to be manufactured from the block materials 80. However, this is not absolutely necessary, since the measurement devices used can also have a constant distance to the measurement object, i.e., to the surface of the block material 80. This is particularly the case when the measurement devices are carried when the cutting unit 50 is placed.

The systems 1, 1', 1" are therefore particularly favourable when a sheet thickness is changed (change of the thickness d of the sheet to be manufactured 90 or also the film 90').

For example, it is also not possible to use the heights directly, i.e., the preliminary source-material height 83 before cutting the block material 80 and the subsequent source-material height 87 after cutting, but rather measured values representing these heights. For example, optical measurements can be taken so that the measurement signal path is representative of the corresponding height. Furthermore, the surface of the block material 80 can be measured and a distance of this surface to the substrate on which the block material 80 rests, i.e., to the contact surface 21 or to the outer shell of the central roller 40, can be known, from which the height of the block material 80 can then be determined.

Values such as the height adjustment of a cutting-unit holder 53 that can be moved in the vertical direction z can also be known and included in the measurements, for example if the measurements were originally calibrated to the height of the support table 20 or the contact surface 21.

As can be seen from the illustrations of the exemplary embodiment of the system 1 from FIG. 1 to FIG. 4, a measurement device 60 is provided for carrying out the described measurement steps. The measurement device 60 is stationary. Measurement device 60 is permanently mounted on the hall floor 2. For this purpose, measurement device 60 comprises a measurement device stand 61, which is permanently mounted on hall floor 2. This means that measurement device 60 is independently stationary. In the arrangement in accordance with FIG. 1 to FIG. 4, measurement device 60 is therefore not connected to the other components of the system 1 in terms of its structural components. However, it is favourable to have at least one communication connection. In this way, by means of a control unit of the system 1, conclusions can be drawn about the control of the process by means of the values measured with the measurement device 60 and adjustments can be made in a targeted manner. The measurement device 60 is set up for measuring on a surface of a measurement object, specifically in the exemplary embodiment shown for measuring on the upper surface of the block material 80 as viewed in the vertical direction z.

Even if the depicted measurement device 60 is stationary, it could also be stationary only with regard to some of its components in space. In particular, it is possible to set up the measurement device in a moveable manner in the vertical direction z, despite its independence from the other components of the system 1. The distance to the measurement object can then be kept at a constant level.

The point on the measurement object where the desired measurement is carried out by means of measurement device 60, or in general within the scope of the present application, is also generally referred to as the measurement-target point. In contrast to this, when we talk about the measurement-device position, we are basically referring to the position of the measurement device 60. The measurement-device position basically describes where the measurement device 60 is spatially arranged. The measurement-device position thus refers to the three coordinates of the measurement device 60, i.e., their position in relation to the longitudinal direction x, latitudinal direction y and vertical direction z. As a rule, however, the same measurement-device position can mean that the measurement device 60 only has the same position with respect to the longitudinal direction x and latitudinal direction y, while the position in the vertical direction z can be adjusted between the measurements for example. Under certain circumstances, one and the same measurement device 60 can drive towards different measurement-target points from one measurement-device position, thereby measuring them. On the one hand, this is conceivable through the use of a line sensor that can measure a plurality of measurement-target points at the same time in relation to the latitudinal direction y of the block material 80. On the other hand, a measurement device 60 can also measure different measurement-target points in the longitudinal direction x at different points in time successively at the same measurement-device position on the measurement object in the form of block material 80, which passes by and is to be measured.

In the present exemplary embodiment of the system 1 shown in FIG. 1 to FIG. 4, the measurement device 60 is arranged at a single measurement-device position. The measurement device 60 in accordance with FIG. 1 to FIG. 4 is not changeable with regard to its measurement-device position. The measurement device 60 is arranged in relation to the longitudinal direction x at only a single measurement-device position and is set up there to measure both the preliminary source-material height 83 before cutting the source material and the subsequent source-material height 87 after cutting the source material at this single measurement-device position. The measurement is carried out along a measuring plane spanned by the latitudinal direction y and vertical direction z.

The measurement device 60 is an optical measurement device. In the present case, a laser-based measurement sensor 62 is used to measure optically on the surface of the block material 80, as indicated by the beam cone 63.

As a result, the measurement device 60 comprises only a single measurement sensor. A plurality of measurement sensors can also be installed within the scope of a measurement device 60, for example, at a single measurement-device position.

In particular, it is also possible to integrate a plurality of measurement sensors into one measurement device 60 over the width of the system 1 extending in the latitudinal direction y, i.e., distributed along the source-material width 82, 86, or to provide a plurality of independent measurement devices. It is also possible to integrate a line sensor, which covers a larger measuring range as viewed in the latitudinal direction y. Also distributed over the length, i.e., along the longitudinal direction x, x' or along the source-material length 81, 85, a plurality of measurement sensors can be provided to form a measurement device. This is the case, for example, with the measurement device 71 shown in FIG. 10 with two measurement sensors (laser-based measurement sensors 62) at two different measurement-device positions.

Alternative arrangements to the described measurement device 60, namely the arrangements of measurement devices 64, 65, 66, and 67, are shown in FIG. 7. FIG. 7 basically shows the system 1 for manufacturing the sheet 90 as an article of manufacture from the block material 80 intended as a source material, as it has also been shown and described in FIG. 1 to FIG. 4. Accordingly, reference can be made to the preceding and also the following embodiments in this regard. The system 1 in accordance with FIG. 7 shows alternative arrangements of measurement devices 64, 65, 66 and 67. In the system 1, therefore, there are deviating measurement-device positions from those in accordance with the illustration of the system 1 in FIG. 1 to FIG. 4. In one go, FIG. 7 illustrates four different alternative or potentially complementary arrangements of a measurement device in a single illustration. In the system 1, the four measurement devices 64, 65, 66 and 67 can in principle be provided individually and used for the favourable measurement of the thickness d of the sheet 90. Measurement devices 64, 65, 66 and 67, as well as the measurement device 60 shown within the scope of FIG. 1 to FIG. 4 could also be provided for a plurality of times together or in different combinations in the system 1. For the sake of clarity and simplification, the illustration of block material 80, which is to be cut into sheets 90, has been dispensed with in FIG. 7.

In a first alternative variant to the measurement device 60 in accordance with FIG. 1 to FIG. 4, the measurement device 64 is relatively invariably connected to the machine stand 10—indicated as variant a) in FIG. 7. The measurement device 64 is connected to the machine stand 10 via the measurement-device suspension 68. Since the machine stand 10 is stationary and permanently connected to the hall floor 2, the measurement device 64 is also stationary.

In another variant, the measurement device 65 is relatively invariably connected to the cutting-unit holder 53—indicated as variant b) in FIG. 7. Due to the vertical displacement of the cutting-unit holder 53, which has already been described above and is also present in the embodiment in accordance with FIG. 7, the measurement device 65 can therefore also be moved vertically and is therefore no longer absolutely stationary. It is favourably ensured that the measurement device 65 always has the same position relative to the cutting unit 50 or the cutting wedge 51.

In another variant, the measurement device 66 is invariably connected to the pressure roller 54 with regard to its relative position-indicated as variant c) in FIG. 7. Due to the vertical displacement of the pressure roller 54, which has already been described above and is also present in the embodiment in accordance with FIG. 7, the measurement device 66 can therefore also be moved vertically and is therefore no longer absolutely stationary. Insofar as the pressure roller 54, as shown here, is also set up independently of the cutting-unit holder 54 or vertically moveable relative to it, it is favourably guaranteed that the vertical position of the measurement device 66 is individually adjustable, namely independently of the cutting unit 50 or the cutting wedge 51. It is also favourable to ensure that the measurement device 66 always has the same position relative to the pressure roller 54. In this way, the distance of the measurement device 66 to the measurement object, i.e., to the block material 80, can also be kept constant.

In another variant, the measurement device 67 is invariably connected to the cutting unit 50 or the cutting wedge 51 with regard to its relative position-indicated as variant d) in FIG. 7. The orientation of the measurement device 67 is such that the measurement takes place, as viewed in the longitudinal direction x, behind the cutting unit 50 or the cutting wedge 51. In contrast to the measurement devices described above, measurement device 67 is no longer arranged in catchment area 3 of the system 1 with regard to its measurement-device position, but rather in discharge area 4.

The alternative measurement devices 64, 65, 66, 67 shown here are, like the measurement device 60 shown in FIG. 1 to FIG. 4, also optical measurement devices with a laser-based measurement sensor 62 (beam cone 63). This also applies to the two measurement devices 70 and 71 (laser-based measurement sensor 62 with a beam cone 63) shown within the scope of system 1' shown in FIG. 8 and FIG. 9 as well as within the scope of system 1" shown in FIG. 10.

The measurement devices 60, 64, 65, 66, 67, 70, 71 shown and thereby being preferred are all set up for measuring on the upper surface of the block material 80 as viewed in the vertical direction z in order to be able to measure the source-material height 83 or 87. Furthermore, the measurement devices 60, 64, 65, 66, 67, 70, 71 are set up and arranged in such a way to measure the source-material height 83, 87 that the respective measurement device 60, 64, 65, 66, 67, 70, 71 can measure both a preliminary source-material height 83 before cutting the block material 80 and subsequently also a subsequent source-material height 87 after the cutting of the block material 80 (i.e., the height of the cut remaining block material 84).

The measurement device 71 in accordance with the exemplary embodiment of the system 1" shown in FIG. 10 is arranged at a first measurement-device position and at a second measurement-device position in relation to the longitudinal direction x'. This is achieved by the fact that a laser-based measurement sensor 62 is provided as a first measurement sensor at the first measurement-device position and another laser-based measurement sensor 62 as a second measurement sensor at the second measurement-device position. The measurement device 71 designed in such a way is set up for measuring the preliminary source-material height 83 before cutting the source material at the first measurement-device position and set up for measuring the subsequent source-material height 87 after cutting the source material at the second measurement-device position.

It is also conceivable that the other systems 1 and 1' (cf., FIG. 1 to FIG. 4, FIG. 7, as well as FIG. 8 and FIG. 9) could be arranged with a plurality of measurement sensors, such as a first measurement sensor for measuring the preliminary source-material height 83 before cutting the source material at the first measurement-device position and a second measurement sensor for measuring the subsequent source-material height 87 after cutting the source material at of the second measurement-device position.

In principle, it is particularly favourable, as shown by the exemplary embodiments in accordance with FIG. 1 to FIG. 4 with regard to measurement device 60, as well as with regard to measurement devices 64, 65 and 66 of variants a), b) and c) from FIG. 7, as well as with regard to measurement device 70 in FIG. 7 and FIG. 8, that the measurement device 60, 64, 65, 66, 70 for measuring the source-material height 83, as viewed in the longitudinal direction x, x', is set up and arranged in front of the cutting unit 50 This area in front of cutting unit 50 can also be referred to as catchment area 3 of the system 1, 1' or 1". In the catchment area 3, the block material 80 is still in the uncut state, which is why the exact measurement of the source-material height 83 before cutting is recommended there. The area behind cutting unit 50 can also be referred to as discharge area 4 of the system 1, 1' or 1", because it is there that the article of manufacture in the form of film 90' or sheets 90 is regularly removed from the system 1, 1', 1". There, in accordance with prior art, the thickness d of the product (film 90' or sheet 90) is measured directly on a regular basis. Since there is no arrangement of measurement devices in the systems 1, 1', 1" shown above, the removal of the article of manufacture can be carried out more easily, and the systems 1, 1', 1" can be designed to be more compact overall.

In the system 1' shown in FIG. 8 and FIG. 9, the cutting unit 50, which is designed as a circumferential blade 52 supported only by braces, can also be adjusted in the vertical direction z. Furthermore, it is also conceivable to equip the system 1' with regard to the cutting unit 50 in such a way that the circumferential blade 52 can also be set at an inclined position (pivoted by the latitudinal direction y) in relation to the block material 80 to be cut, meaning setting it into an angle of attack again.

This also applies analogously to the cutting unit 50 shown and described within the scope of the system 1" in FIG. 10. The corresponding cutting wedge 51 could also be set up to be adjustable in the vertical direction z. The cutting wedge 51 can then be moved closer to the central roller 40 or back again. In the present case, however, and in this respect, it is preferred, that the central roller 40 can be moved in the direction of cutting wedge 51 and thus advanced. It is also possible to change the angle of attack of the cutting wedge 51 for cutting the block material 80, which is designed as a round block.

By means of the systems 1, 1' and 1" shown for manufacturing sheets 90 and films 90' respectively from block material 80 of foam, the favourable method for determining a thickness d of a film 90' or sheet 90 can be carried out according to the proposal. As part of the proposed method, the film 90' or sheet 90 is cut as an article of manufacture from the block material 80 (foam block) intended as a source material. In order to cut the source material, the source material is conveyed along the longitudinal direction x or x' to the cutting unit 50, wherein the cutting unit 50 in turn cuts out the film 90' or sheet 90 from the source material along the longitudinal direction x, x'. The thickness d of the cut film 90' or sheet 90 to be determined is then measured by it, in that:

the measurement devices 60, 64, 65, 66, 67, 70, or 71 measure a preliminary source-material height 83 before cutting the block material 80 and a subsequent source-material height 87 after cutting the block material 80, and the thickness d of the film 90' or sheet 90 is determined from the difference of the preliminary source-material height 83 minus the subsequent source-material height 87.

Measured values representing the respective height can also be measured, such as the transit time of an optical measurement signal for example, and these can then be calculated accordingly analogue so that finally the thickness d of the film 90' or sheet 90 can be deduced.

The systems 1, 1', 1" comprise additional evaluation units not shown for the execution of the method, which convert the calculation operations such as the calculating the difference or the conversion of measurement signals of the measurement devices 60, 64, 65, 66, 67, 70, or 71 into corresponding thickness values.

In addition, the systems 1, 1', 1" also comprise control units (not shown), by means of which the manufacturing process of films 90' and sheets 90 running on the corresponding system 1, 1', 1" can be controlled. For this purpose, the control units can preferably also be arranged in a communication connection with the evaluation unit or the measurement devices 60, 64, 65, 66, 67, 70, or 71. For example, the detection of the thickness d of the cut films 90' or sheets 90 can be used on the one hand for quality control of the article of manufacture, but on the other hand also for controlling the further manufacturing process in terms of regulation.

If, for example, the goal is to produce a sheet 90 of thickness d=10 mm, then the result known from capturing the thickness d of a first cut sheet 90 can be favourably used to control the following cuts. For example, the source-material height of 83 is usually known as the initial variable of the process, which is originally the source material available as block material 80. Cutting unit 50 is then set to a specific first vertical position in order to obtain the intended cut to achieve a thickness d of 10 mm. The system 1, 1', 1" is then regularly adjusted in such a way that, after a first cut, the cutting unit 50 is adjusted with regard to its vertical position, and the cutting unit 50 is adjusted to a second vertical position, thereby being reduced by 10 mm. If, as proposed, the actual thickness d resulting from the first cut, in the example mentioned above 8 mm, is detected, the vertical adjustment of the cutting unit 50 (e.g., the vertical displacement of the cutting-unit holder 52) can be adjusted for the subsequent cut. In this way, consequential errors can be successfully avoided.

According to the proposal, a method of operation can therefore be carried out on the described systems 1, 1', 1", wherein the film 90' or the sheet 90 is cut out of the block material 80 (foam block) intended as a source material by means of the cutting unit 50, and wherein, for the quality control of the cut film 90' or sheet 90, a precedingly or subsequently described method is carried out to determine a thickness d of a film 90' or sheet 90.

It is particularly favourable if the system 1, 1', 1" is operated in such a way that, depending on the result of the method for determining the thickness d of the film 90' or sheet 90 in relation to a preceding layer, the cutting unit 50 is adjusted with regard to its position in relation to the source material, in particular, in the vertical direction z, in order to cut a subsequent layer. Specifically, the cutting unit 50 is adjusted more or less downwards against the vertical direction z as described, depending on the thickness d detected.

In the case of the systems 1, 1', 1" shown, it is particularly favourable that the respective measurement devices 60, 64, 65, 66, 67, 70, 71 are set up and arranged for measuring the source-material length 81, 85. This makes it possible to use a method for operating the system 1, 1', 1" in which the source-material length is determined in the longitudinal direction x, x' by means of the measurement device 60, 64, 65, 66, 67, 70, 71. Thus, by measuring on the block material 80, the respective measurement device 60, 64, 65, 66, 67, 70, 71 can determine a starting point at which the block material 80 enters the measuring range and an end time upon discharge of the block material 80, from which the source-material length 81, 85 can be determined. It is possible to dispense with the provision of additional light barriers in the 1, 1', 1" system, which would otherwise take over this task. In the exemplary embodiment of the round block in FIG. 10, the circumference of the block material 80 can be determined in this way, wherein it is not the entry and discharge of the block material 80 itself that can be detected, but of a reference point rotating with the block material 80.

This basic detection of the extension in the longitudinal direction x, x' or generally the position of the block material 80 in that direction can also be used to control the manufacturing process. Thus, in the case of the systems 1 in accordance with FIG. 1 to FIG. 4 and FIG. 7, as well as in the case of the system 1' in accordance with FIG. 8 and FIG. 9, the knowledge of the position of the block material in the longitudinal direction x, x' can be used to adjust the conveying speed, particularly to increase it when there is no cutting of the block material 80. The conveying speed can then also be reduced in the inlet and outlet areas with the cutting tool, while the conveying speed can be increased even in the middle area when the cut is made.

The systems 1, 1', 1" can be operated favourably by adjusting the conveying speed of the source material in the longitudinal direction x, x' depending on the position of the source material detected by the measurement device 60, 64, 65, 66, 67, 70, 71. Overall, this can improve cutting thickness tolerances and increase manufacturing speeds.

In addition, favourable control of the shown systems 1, 1', 1" can be achieved by adjusting a vertical position of the cutting unit 50 in the vertical direction z depending on the position of the source material detected by the measurement device 60, 64, 65, 66, 67, 70, 71.

All in all, with the presented and described systems 1, 1', 1", a favourable manufacture of films 90' or sheets 90 from the block material 80 is possible, by running the described method for measuring the thickness d of the film 90' or sheet 90 on the system 1, 1', 1" and using the result to control the manufacturing method. For example, by vertically adjusting the cutting unit 50 at appropriate moments, or also by correcting and changing an originally specified vertical adjustment of the cutting unit 50 for cutting a subsequent sheet 90 or the position of a film 90' on the basis of the detected thickness. Accordingly, the present invention makes it possible to further improve the manufacturing process of films 90' or sheets 90 made of block material in such a way that the manufacturing process can be further automated and more reliable with regard to a uniform quality of the articles of manufacture.

REFERENCE LIST

| | |
|---|---|
| 1, 1', 1" | system |
| 2 | hall floor |
| 3 | catchment area |
| 4 | discharge area |
| 10 | machine stand |
| 20 | support table |
| 21 | contact surface |
| 30 | conveyor unit |
| 31 | support carriage |
| 40 | central roller |
| 41 | drive rollers |
| 50 | cutting unit |
| 51 | cutting wedge |
| 52 | circumferential blade |
| 53 | cutting-unit holder |
| 54 | pressure roller |
| 60, 64, 65, 66, 67, 70, 71 | measurement device |
| 61 | measurement device stand |
| 62 | laser-based measurement sensor |
| 63 | beam cones |
| 68, 69 | measurement-device suspension |
| 80 | block material |
| 81, 85 | source-material length |
| 82, 86 | source-material width |
| 83, 87 | source-material height |
| 84 | remaining block material cut |
| 88 | cut surface |
| 90' | sheet |
| 90 | film |
| 91 | sheet length |
| 92 | sheet width |
| x, x' | longitudinal direction |
| y | latitudinal direction |
| z | vertical direction |
| d | thickness of the film or the sheet |

The invention claimed is:

1. A method for determining a thickness (d) of a film (90') or sheet (90) made of foam, the method comprising:
    conveying, by a conveyor unit, a source material along a longitudinal direction, the source material provided as a foam block, wherein the film or the sheet is cut as an article of manufacture from the foam block, and wherein the source material has a source-material length extending in the longitudinal direction, a source-material width extending in a latitudinal direction and a source-material height extending in a vertical direction;
    cutting, by a cutting unit, the film or the sheet from the source material along the longitudinal direction as the source material is conveyed along the longitudinal direction to the cutting unit; and
    determining, by a measurement device, a thickness of the film or the sheet along the vertical direction, wherein the thickness is determined from a difference between a measured value representing a preliminary source-material height before the cutting and a measured value representing a subsequent source-material height after the cutting.

2. The method according to claim 1, wherein the measurement device comprises an optical measurement device.

3. A system for manufacturing a film (90') or a sheet (90) made of foam as an article of manufacture made from a foam block (80) provided as a source material, wherein the source material has a source-material length (81, 85) extending in the longitudinal direction (x; x'), a source-material width (82, 86) extending in the latitudinal direction (y) and a source-material height (83, 87) extending in the vertical direction (z), the system comprising
    a conveyor unit (30) for conveying the source material along the longitudinal direction (x; x'),
    a cutting unit (50) for cutting out the film (90') or the sheet (90) from the source material along the longitudinal direction (x; x'), with a blade bar with a circumferential blade or oscillating blade,
    a measurement device (60, 64, 65, 66, 67, 70, 71) for measuring on a surface of a measurement object, and
    a control unit for determining a thickness of the film or the sheet, the thickness determined based on a difference between a measured value representing a preliminary source-material height and a measured value representing a subsequent source-material height,
    wherein the conveyor unit (30) is set up in such a way that, in order to cut the source material, the source material is conveyed along the longitudinal direction (x; x') past the cutting unit (50), wherein the measurement device (60, 64, 65, 66, 67, 70, 71) is set up and arranged for measuring the source-material height (83, 87) in such a way that the measurement device (60, 64, 65, 66, 67, 70, 71) is configured to measure the preliminary source-material height (83; 87) before the cutting of the source material and the subsequent source-material height (87) after the cutting of the source material.

4. The system according to claim 3, further comprising:
a linear machine table, the linear machine table comprising the conveyor unit (30) and configured to support the source material, the conveyor unit (30) set up on the support side of the linear machine table in a reversing manner along the longitudinal direction (x).

5. The system according to claim 3, further comprising:
a rotary table, the rotary table comprising the conveyor unit (30) and configured to support the source material, wherein the conveyor unit (30) is designed as a circumferential contact surface (21) of the rotary table and is set up to be circumferentially moveable along the longitudinal direction (x').

6. The system according to claim 3, further comprising:
a central roller (40) formed as a round block that receives the source material, and that the conveyor unit (30) is formed by the central roller (40) in such a way that the central roller (40) is configured to be driven in the direction of rotation for conveying the source material.

7. The system according to claim 3, wherein the measurement device (60, 64, 65, 66, 67, 70) is arranged in relation to the longitudinal direction (x; x') at only a single measurement-device position on a measuring plane spanned by the latitudinal direction (y) and vertical direction (z).

8. The system according to claim 3, wherein the measurement device (64, 65, 66, 67, 71) is arranged at least at a first measurement-device position in relation to the longitudinal direction before the cutting of the source material for measuring the preliminary source-material height and at a second measurement-device position in relation to the longitudinal direction (x; x') after the cutting of the source material for measuring the subsequent source-material height, and wherein the measurement device (64, 65, 66, 67, 71) includes a first measurement sensor arranged at the first measurement-device position and a second measurement sensor arranged at the second measurement-device position.

9. The system according to claim 3, wherein the cutting unit (50) is configured to be adjustable for adjusting its vertical position in the vertical direction (z).

10. The system according to claim 3, wherein the cutting unit (50) is integrated into a cutting-unit holder (53), wherein the cutting-unit holder (53) is connected to a stationary fixed machine stand (10), and wherein the cutting-unit holder (53) is adjusted by an angle of inclination ($\alpha$) from −5° to 30°, rotating around the latitudinal direction (y) against the longitudinal direction (x; x') and pivotable backwards.

11. The system according to claim 3, further comprising:
a pressure roller (54) for pressing a surface of the source material against the vertical direction (z), wherein the pressure roller (54) is arranged, as viewed in the longitudinal direction (x; x'), in front of the cutting unit (50).

12. The system according to claim 11, wherein the pressure roller (54) is configured to be adjustable in the vertical direction (z) and the longitudinal direction (x; x').

13. The system according to claim 11, wherein the measurement device (66) is relatively invariably connected to the pressure roller (54).

14. The system according to claim 10, wherein the measurement device (65) is relatively invariably connected to the cutting-unit holder (53).

15. The system according to claim 10, wherein the measurement device (60, 70) is independently stationary fixed, or relatively invariably connected to the machine stand (10).

16. The system according to claim 3, wherein the measurement device (60, 64, 65, 66, 70) for measuring the source-material height (83, 87), as viewed in the longitudinal direction (x; x'), is set up and arranged in front of the cutting unit (50).

17. A method for operating a system for manufacturing a film (90') or a sheet (90) made of foam as an article of manufacture made from a foam block provided as a source material, the method comprising:
conveying, by a conveyor unit of the system, the source material along a longitudinal direction, wherein the source material has a source-material length extending in the longitudinal direction, a source-material width extending in a latitudinal direction and a source-material height extending in a vertical direction;
cutting, by a cutting unit of the system, out the film or the sheet from the source material along the longitudinal direction, wherein the cutting unit includes a blade bar with a circumferential blade or oscillating blade and wherein the conveyor unit is set up in such a way that the source material is conveyed along the longitudinal direction past the cutting unit;
measuring, by a measurement device of the system, on a surface of a measurement object, wherein the measurement device is set up and arranged for measuring the source-material height in such a way that the measurement device is configured to measure a preliminary source-material height before the cutting of the source material and a subsequent source-material height after the cutting of the source material; and
determining, by a control unit of the system, a thickness of the film or sheet from the difference between a measured value representing the preliminary source-material height minus the measured value representing the subsequent source-material height.

18. The method according to claim 17, further comprising:
depending on a result of the determining the thickness (d) of the film (90') or sheet (90) with respect to a preceding layer, adjusting the cutting unit (50) with respect to its position in relation to the source material for cutting a subsequent layer.

19. The method according to claim 17, wherein the measurement device (60, 64, 65, 66, 67, 70, 71) is used to detect the source-material length in the longitudinal direction (x; x').

20. The method according to claim 17, further comprising:
adjusting a conveying speed of the source material based on a position of the source material detected by the measurement device (60, 64, 65, 66, 67, 70, 71).

21. The method according to claim 17, further comprising:
adjusting a vertical position of the cutting unit (50) based on a position of the source material detected by the measurement device (60, 64, 65, 66, 67, 70, 71).

22. The method according to claim 17, wherein the film (90') or the sheet (90) is removed from the system after the cutting.

* * * * *